United States Patent
Sugiyama et al.

(10) Patent No.: US 11,301,789 B2
(45) Date of Patent: Apr. 12, 2022

(54) INFORMATION PROCESSING APPARATUS, RIDING VEHICLE ADJUSTING METHOD, AND RIDING VEHICLE ADJUSTING PROGRAM

(71) Applicant: TOYOTA JIDOSHA KABUSHIKI KAISHA, Toyota (JP)

(72) Inventors: Koseki Sugiyama, Suntou-gun (JP); Atsuko Kobayashi, Nagoya (JP); Hiroki Asano, Toyota (JP); Harunobu Saito, Nagoya (JP); Yoshihiro Tsuge, Toyota (JP); Tae Sugimura, Miyoshi (JP); Kuniaki Jinnai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/451,555

(22) Filed: Jun. 25, 2019

(65) Prior Publication Data

US 2020/0019906 A1  Jan. 16, 2020

(30) Foreign Application Priority Data

Jul. 11, 2018 (JP) .............................. JP2018-131696

(51) Int. Cl.
*G06Q 10/06* (2012.01)
(52) U.S. Cl.
CPC .............................. *G06Q 10/06312* (2013.01)
(58) Field of Classification Search
CPC .............................................. G06Q 10/06312
USPC ....................................................... 705/7.22
See application file for complete search history.

(56) References Cited

U.S. PATENT DOCUMENTS

| 9,402,093 B2* | 7/2016 | Lieu | H04N 21/41422 |
|---|---|---|---|
| 10,928,210 B2* | 2/2021 | Pan | G01C 21/3438 |
| 2001/0037174 A1* | 11/2001 | Dickerson | G06Q 50/30 |
| | | | 701/400 |
| 2009/0049044 A1* | 2/2009 | Mitchell | G06Q 30/08 |
| 2015/0081362 A1* | 3/2015 | Chadwick | G06Q 10/06311 |
| | | | 705/7.14 |
| 2016/0027306 A1* | 1/2016 | Lambert | G08G 1/202 |
| | | | 701/117 |

(Continued)

FOREIGN PATENT DOCUMENTS

| JP | 2002-148061 A | 5/2002 |
|---|---|---|
| JP | 2007-163231 A | 6/2007 |

(Continued)

*Primary Examiner* — Folashade Anderson
(74) *Attorney, Agent, or Firm* — Oliff PLC

(57) ABSTRACT

An information processing apparatus according to the present disclosure includes a controller configured to execute: determining whether to change a scheduled riding vehicle for a first user or not based on predetermined position information related to a first user's riding a first vehicle, before a scheduled time on which the first user is to board the first vehicle which the first user is scheduled to board at a first boarding place; extracting one or more candidate vehicles serving as alternative candidates for the first vehicle, when it is determined to change the scheduled riding vehicle for the first user; and changing the scheduled riding vehicle for the first user from the first vehicle to a second vehicle that is one of the one or more candidate vehicles, based on an approval by the first user.

8 Claims, 13 Drawing Sheets

(56) References Cited

U.S. PATENT DOCUMENTS

| | | | |
|---|---|---|---|
| 2016/0075333 A1* | 3/2016 | Sujan | B60W 10/02 |
| | | | 701/25 |
| 2016/0364679 A1* | 12/2016 | Cao | G06Q 50/30 |
| 2017/0169366 A1* | 6/2017 | Klein | G06Q 50/30 |
| 2017/0185948 A1* | 6/2017 | Magazinik | G06Q 10/063118 |
| 2018/0005144 A1* | 1/2018 | Lo | G06Q 10/06311 |
| 2018/0012151 A1* | 1/2018 | Wang | G06Q 10/0639 |
| 2019/0108468 A1* | 4/2019 | Nguyen | G06Q 50/30 |
| 2021/0209524 A1* | 7/2021 | Oppelstrup | G06Q 10/025 |

FOREIGN PATENT DOCUMENTS

| | | |
|---|---|---|
| JP | 2010-164435 A | 7/2010 |
| JP | 2013-242685 A | 12/2013 |

* cited by examiner

| VEHICLE NO. | DRIVER ID | VEHICLE TYPE | TRAVEL SCHEDULE | RIDESHARE RESERVATION | EXECUTION FLAG | TRAVELING POSITION | DESTINATION |
|---|---|---|---|---|---|---|---|
| X10 | S001 | A100 | sssss | xxxxxxxxx | IN EXECUTION | P111 | G111 |
| X20 | S002 | A200 | ttttt | yyyyyyyy | NOT EXECUTED | P222 | G222 |
| X30 | S003 | A300 | uuuuu | zzzzzzzzz | NOT EXECUTED | P333 | G333 |

Fig. 4

| DRIVER ID | USER ID | VEHICLE NO. | BOARDING PLACE | SCHEDULED BOARDING TIME | TRAVEL DESTINATION | DESIRED ARRIVAL TIME | PASSENGER | COMPLETION FLAG |
|---|---|---|---|---|---|---|---|---|
| S001 | C001 | X10 | f | 8:00 | g | 9:00 | ABSENT | COMPLETED |
| S001 | C002 | X10 | h | 8:30 | s | 9:30 | PRESENT | COMPLETED |
| S002 | C003 | X20 | p | 17:30 | q | 18:30 | ABSENT | INCOMPLETE |

Fig. 5

INFORMATION PROCESSING APPARATUS, RIDING VEHICLE ADJUSTING METHOD, AND RIDING VEHICLE ADJUSTING PROGRAM

CROSS REFERENCE TO RELATED APPLICATION

This application claims priority to Japanese Patent Application No. 2018-131696, filed on Jul. 11, 2018, which is hereby incorporated by reference herein in its entirety.

BACKGROUND

Technical Field

The present disclosure relates to an information processing apparatus, a riding vehicle adjusting method, and a riding vehicle adjusting program.

Description of the Related Art

Patent document 1 discloses a technique related to an information acquisition apparatus that allows a first meeting person to know that a second meeting person, or an opposite party to be met, is to be late from a meeting time even without any notification from this party. According to this technique, if the information acquisition apparatus determines that the meeting time is not to be kept, the meeting time is changed and the changed meeting time is notified to both the parties.

CITATION LIST

Patent Document

[Patent document 1] Japanese Patent Laid-Open No. 2007-163231

SUMMARY

The present disclosure has an object to provide a technique that extracts an alternative vehicle to support a user's travel when a scheduled riding vehicle for the user is determined to be changed.

An information processing apparatus according to the present disclosure comprises a controller configured to execute: determining whether to change a scheduled riding vehicle for a first user or not based on predetermined position information related to a first user's riding a first vehicle, before a scheduled time on which the first user is to board the first vehicle which the first user is scheduled to board at a first boarding place; extracting one or more candidate vehicles serving as alternative candidates for the first vehicle, when it is determined to change the scheduled riding vehicle for the first user; and changing the scheduled riding vehicle for the first user from the first vehicle to a second vehicle that is one of the one or more candidate vehicles, based on an approval by the first user.

The present disclosure can also be grasped in view of a riding vehicle adjusting method by a computer. A riding vehicle adjusting method according to the present disclosure causes a computer to: determine whether to change a scheduled riding vehicle for a first user or not based on predetermined position information related to a first user's riding a first vehicle, before a scheduled time on which the first user is to board the first vehicle which the first user is scheduled to board at a first boarding place; extract one or more candidate vehicles serving as alternative candidates for the first vehicle, when it is determined to change the scheduled riding vehicle for the first user; and change the scheduled riding vehicle for the first user from the first vehicle to a second vehicle that is one of the one or more candidate vehicles, based on an approval by the first user.

The present disclosure can also be grasped in view of a riding vehicle adjusting program to be executed by a computer. That is, a riding vehicle adjusting program according to the present disclosure causes a computer to execute: a step of determining whether to change a scheduled riding vehicle for a first user or not based on predetermined position information related to a first user's riding a first vehicle, before a scheduled time on which the first user is to board the first vehicle which the first user is scheduled to board at a first boarding place; a step of extracting one or more candidate vehicles serving as alternative candidates for the first vehicle, when it is determined to change the scheduled riding vehicle for the first user; and a step of changing the scheduled riding vehicle for the first user from the first vehicle to a second vehicle that is one of the one or more candidate vehicles, based on an approval by the first user.

According to the present disclosure, when the scheduled riding vehicle for the user is determined to be changed, an alternative vehicle can be extracted to support the user's travel.

BRIEF DESCRIPTION OF THE DRAWINGS

FIG. 4 depicts a data structure of vehicle information in a vehicle database that the server apparatus has;

FIG. 5 depicts a data structure of use management information in a use management database that the server apparatus has;

DESCRIPTION OF THE EMBODIMENTS

Figure 1:
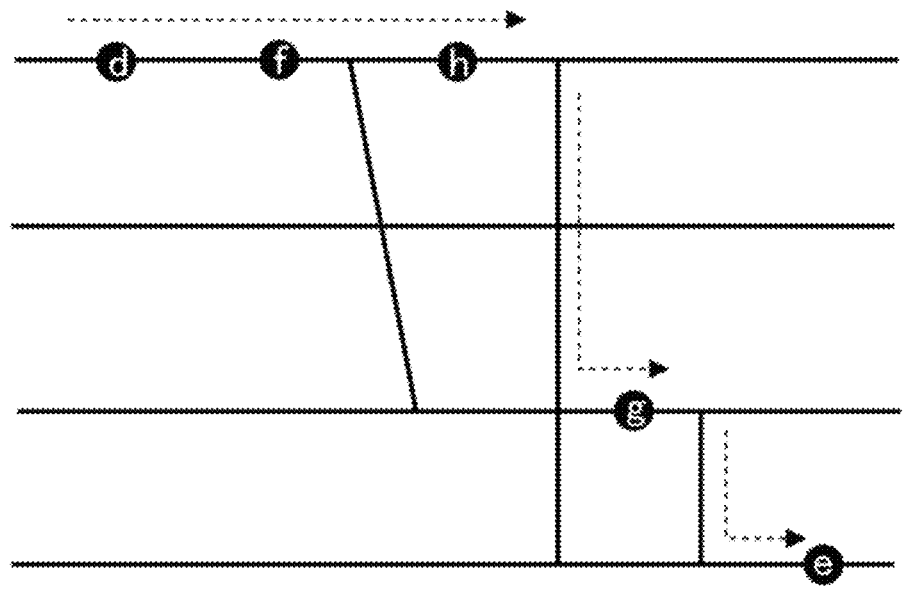
FIG. 1 is a diagram for illustrating a concept of rideshare.

A controller of an information processing apparatus according to the present disclosure determines the permissibility on whether or not a first user is to board a first vehicle before a scheduled time of boarding, on the basis of predetermined position information. That is, the permissibility determination is performed from a time when the first user is scheduled to board to a time when the scheduled time comes. Accordingly, extraction of one or more candidate vehicles and change of the scheduled riding vehicle for the first user by the controller are performed on the basis of the result of the permissibility determination but are not performed on the basis of the fact that the first user was incapable of boarding the first vehicle at a scheduled boarding time.

Here, the predetermined position information is information that is related to the first user's riding the first vehicle and allows such boarding permissibility determination before the scheduled boarding time. For example, the predetermined position information is at least one of position information on the first user and position information on the first vehicle. Through use of such position information, a time by which the first user or the first vehicle can reach a first boarding place is compared with the scheduled time. If the deviation is a predetermined time period or longer, it can be believed that for a meeting between the first user and the first vehicle, a time period for which one party is caused to wait is relatively long. Accordingly, it can be determined that the scheduled riding vehicle for the first user is to be changed. In another example, the predetermined position information is position information on the first boarding place related to the value of a predetermined parameter related to an environmental load due to the first user's travel to the travel destination, and position information on the first vehicle. Through use of such position information, the environmental load for allowing the first user to travel to the travel destination can be represented via the value of the predetermined parameter. When the value of the predetermined parameter in a case of using the first vehicle means that the environmental load is higher in comparison with the value of the predetermined parameter in a case of using a vehicle other than the first vehicle, the first user's travel using the first vehicle is unpreferable in view of the environmental load in some cases. Accordingly, it can be determined that the scheduled riding vehicle for the first user is to be changed. Note that the predetermined position information is not limited to the example described above.

If it is determined that the scheduled riding vehicle for the first user is to be changed, the controller of the information processing apparatus extracts one or more candidate vehicles serving as alternative candidates for the first vehicle in order to allow the first user to travel to the travel destination. Preferably, the extraction is performed in a form of presenting candidate vehicles as many as possible to the first user becoming incapable of traveling in the scheduled first vehicle, in order to achieve the first user's travel to the travel destination. For example, the candidate vehicles may be extracted from among at least any of one or more vehicles allowing the first user to board at the first boarding place and one or more vehicles allowing the first user to board at a temporary boarding place at the middle from the current position of the first user to the first boarding place. Furthermore, as for the extraction, to facilitate the first user's travel to the travel destination, the controller may extract, as the candidate vehicles, vehicles which are to travel by way of a predetermined alighting place which is a place where even a vehicle which is not to travel by way of the travel destination of the first user can allow the first user to travel to the travel destination, based on information which the controller can obtain and which is related to a travel of a vehicle other than the first vehicle. The predetermined alighting place is a place preferable for allowing the riding first user to alight from the vehicle and reach the travel destination by transportation other than the vehicle, for example, a boarding place (a station, a bus stop or a place adjacent thereto) of public transportation (a railroad, bus, etc.) allowing the first user to travel to the travel destination. That is, instead of direct extraction of the vehicle that reaches the travel destination of the first user, the vehicle that does not reach the travel destination is extracted as the candidate vehicle. Accordingly, it can be considered that the extraction is performed, with a condition related to presentation of the candidate vehicle to the first user being relaxed. Even the candidate vehicle extracted in such a condition allows the first user to travel to the travel destination as a result. Accordingly, it is believed to be useful.

The controller of the information processing apparatus then changes the scheduled riding vehicle for the first user from the originally specified first vehicle to a second vehicle that is one vehicle among the one or more candidate vehicles, on the basis of an approval made by the first user for the one or more candidate vehicles extracted as described above. That is, the first user is scheduled to ride the second vehicle. According to the information processing apparatus of the present disclosure, when it is determined to change the first user's boarding the first vehicle on the basis of the predetermined position information, the extraction process described above is performed and the approval is made by the first user. Accordingly, the scheduled riding vehicle for the first user is preferably adjusted. Consequently, the travel of the first user is preferably supported.

First Embodiment

<System Overview>

An overview of a rideshare system 1 of this embodiment is described. First, referring to FIG. 1, the concept of rideshare, which is transportation allowing users matched by the rideshare system 1 to ride with each other and travel, is described. In FIG. 1, a user A travels from a departure point d to a destination point e, a user B travels from a departure point f to a destination point g, and a user C travels from a departure point h to a destination point e.

Here, if the users A to C separately travel to the destination points in the respective vehicles, the three vehicles are to be used. On the contrary, if the users A to C ride with each other (rideshare), the users are allowed to travel to the respective destinations in one vehicle. In an example depicted in FIG. 1, the user A serves as a driver of the vehicle, and drives the vehicle from the point d to the point e. In this case, the user A allows the user B to ride the vehicle driven by the user A at the point f, and allows the user C to ride the vehicle driven by the user A at the point h. The user A then travels by way of the point g at the middle of travel in the vehicle to the point e, which is the destination point of the user A and the user C, and allows the user B to alight at the point g, thereby enabling the user B to travel from the departure point f to the destination point g. Furthermore, the user A allows the user C to travel to the point e, which allows the user C to travel from the departure point h to the destination point e and can complete the travel of the user A.

Such rideshare can reduce the number of vehicles traveling on roads, which can in turn reduce traffic jams. The rideshare reduces the number of traveling vehicles. Accordingly, the environmental load due to the user's travel can be reduced (for example, reduction in $CO_2$ gas emission due to vehicle traveling, suppression of consumption of the amount of energy used for vehicle traveling (the amount of fuel in a case where the vehicle uses an internal combustion engine, and the electric energy in a case where the vehicle uses electric power) and the like). Note that the mode of the rideshare depicted in FIG. 1 is one example. In this embodiment, a publicly known matching technique combines the vehicle (driver) with a passenger who is to ride the vehicle, thereby achieving rideshare. In this embodiment, the passenger allowed to ride the vehicle is hereinafter called "user."

Figure 2:
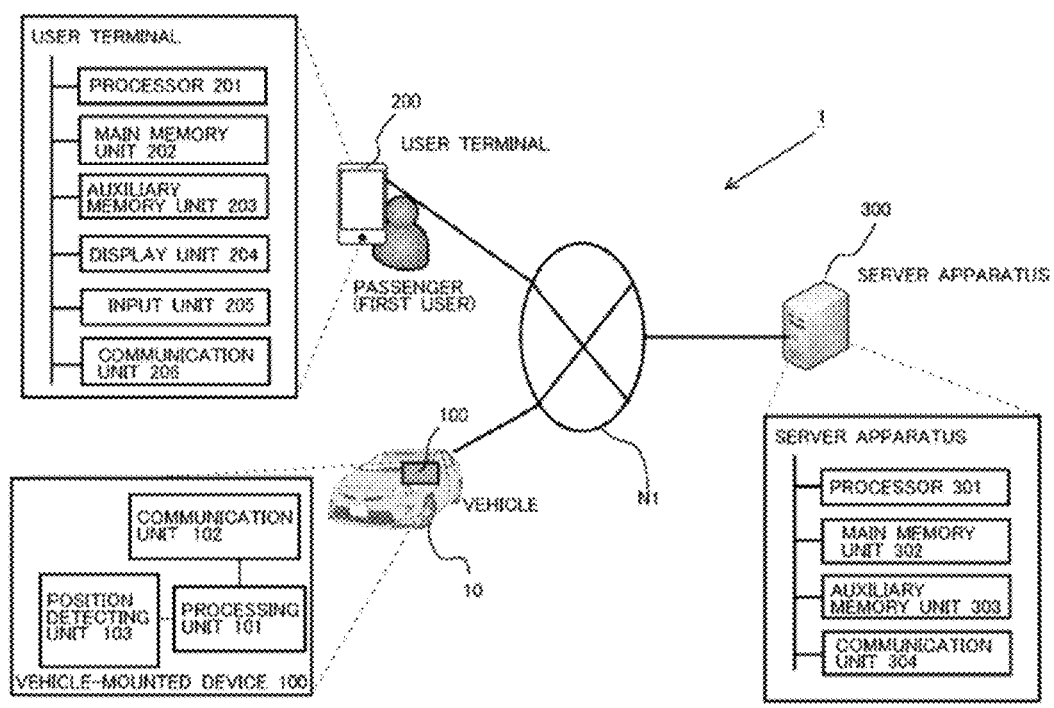
FIG. 2 depicts a schematic configuration of a rideshare system to which an information processing apparatus of the present disclosure is applied.

Here, referring to FIG. 2, the schematic configuration of the rideshare system 1 is described. The rideshare system 1 depicted in FIG. 2 is a system that performs a process of combining the first user with the vehicle in order to allow the first user to enjoy rideshare, that is, to allow the first user to ride a vehicle driven by another person or an automatically driven vehicle, and includes a vehicle 10, a vehicle-mounted device 100 installed in the vehicle 10, a user terminal 200 that is a terminal owned by the first user, and a server apparatus 300. The vehicle-mounted device 100, the user terminal 200, and the server apparatus 300 are connected to each other by a network N1. The network N1 is, for example, a worldwide public communication network, such as the Internet. A WAN (Wide Area Network) or another communication network may be adopted. The network N1 may include a telephone communication network such as of mobile phones, and a wireless communication network such as WiFi. Note that in the rideshare system 1 depicted in FIG. 2, the user terminal 200 of the first user, the vehicle 10, and the vehicle-mounted device 100 mounted thereon are exemplified. Another user can participate in the rideshare system 1 via the user terminal. Another vehicle and the like can also participate in the rideshare system 1.

Here, the server apparatus 300 accepts a registration of information from the first user who uses rideshare. Identification information related to the first user and information on the vehicle provided for rideshare are registered in the server apparatus 300. The first user requesting a shared ride in any vehicle registered in the server apparatus 300 can register information indicating a request for a shared ride (hereinafter, request information) using the user terminal 200. Note that the first user can register, in the server apparatus 300, the request information through an application installed in the user terminal 200 for using a rideshare service (hereinafter, sometimes called "predetermined application"), for example. However, there is no intention of limitation to the mode of registering the request information using the user terminal 200. The first user may register the request information in the server apparatus 300 using any of terminals (a smartphone, a mobile phone, a tablet terminal, a personal information terminal, a wearable computer, etc.) and a personal computer (PC) that are connectable to the network N1. The identification information related to the first user, and the information on the vehicle provided for rideshare are preliminarily registered by the predetermined application. When the first user registers the request information using the predetermined application, user authentication is preliminarily performed using a password or the like before registration of the request information.

Upon acceptance of the registration of request information issued by the first user, the server apparatus 300 performs the matching process between the user and the vehicle for the first user's shared ride. In the example in FIG. 2, the vehicle 10 is selected as the vehicle which the first user is to ride, from among the vehicles registered in the server apparatus 300. Here, the server apparatus 300 can match up the first user with the vehicle using a publicly known technique. For example, the pieces of information on the vehicles registered in the server apparatus 300 are associated with the respective pieces of identification information related to the drivers of the vehicles. For each vehicle provided for rideshare, a travel schedule of the vehicle is preliminarily registered in the server apparatus 300 by the driver. The server apparatus 300 can then temporarily match up the first user with the vehicle on the basis of the travel schedule of the first user and of the travel schedule of the vehicle registered in the server apparatus 300. The travel schedule of the first user is information related to the time when the first user desires rideshare and to the travel path (the boarding place, the travel destination, etc.), and may be included in request information issued by the first user.

After the temporary matching process described above, the server apparatus 300 notifies the first user of predetermined information pertaining to rideshare (for example, transmission to the user terminal 200). Here, the predetermined information is, for example, information related to the vehicle 10 (the vehicle type, color, vehicle number, etc.), information related to the driver of the vehicle 10 (the gender, age, etc.), information related to the travel (the rendezvous place with the vehicle 10, the scheduled meeting time, the travel path, the scheduled arrival time to the travel destination, presence or absence of another user, the cost for the travel, etc.). The server apparatus 300 notifies the vehicle 10 of information, such as the gender and age of the first user, the rendezvous place desired by the user, the scheduled meeting time, and the travel destination (for example, transmission to the vehicle-mounted device 100). The first user and the vehicle that have obtained the information described above approve the temporary matching result presented by the server apparatus 300, thereby finally determining the matching between the first user and the vehicle 10. Note that in this embodiment, the vehicle that the first user is scheduled to ride by the matching process is regarded as the first vehicle 10.

As described above, according to the rideshare, the matching process is performed before a time when the boarding in a shared manner is scheduled (hereinafter, simply called "scheduled time"). The matching process also determines the place where the first user is scheduled to board the first vehicle 10 (hereinafter called "first boarding place"), that is, the rendezvous place for allowing the first user to board the first vehicle 10 in a shared manner. However, a case where it is more preferable to change the scheduled riding vehicle for the first user can occur because of a certain reason. For example, if the time when one of the first user and the first vehicle 10 is to reach the first boarding place deviates too much from the scheduled time, one of the parties matched up for the rideshare is in a state of being unreasonably caused to wait. For example, if one party reaches the first boarding place with a delay from the scheduled time, the other party is caused to wait. On the contrary, if the one party reaches the first boarding place before the scheduled time, the one party is to wait for the other party until the scheduled time. In such a case, the rideshare matching itself limits the behaviors of the parties.

Preferably, it is believed that the first user's travel is achieved by another vehicle instead of the vehicle 10 having once been matched up.

In some cases, it may be preferable to achieve the first user's travel by another vehicle in a view different from a view of rendezvous at the scheduled time. For example, a case where after completion of matching between the first user and the first vehicle 10, the environmental load due to travel can be more reduced by achieving the first user's travel by another vehicle. The environmental load due to travel in this embodiment is increase in $CO_2$ gas emitted by vehicle traveling, increase in energy used for the traveling and the like. If the environmental load is more reduced by achieving the first user's travel by another vehicle instead of the vehicle 10, it is preferable to achieve a shared ride by the other vehicle without a shared ride by the originally specified matching result.

On the other hand, if the scheduled riding vehicle for the first user is changed because of a certain reason as described above, the first user scheduled to ride the first vehicle 10 loses transportation to the travel destination. To support the travel of the first user scheduled to ride the vehicle while not unreasonably limiting the behaviors of the rideshare parties by matching, the rideshare system 1 performs a matching adjustment process that adjusts the scheduled riding vehicle for the first user in addition to the matching process. Accordingly, matching of another vehicle serving as alternative transportation with the first user having lost transportation because of a certain reason can preferably achieve a travel support for the first user. The details of the matching adjustment process are described later.

(Hardware Configurations)

FIG. 2 exemplifies the hardware configurations of the vehicle-mounted device 100 mounted on the vehicle 10, the user terminal 200, and the server apparatus 300. First, the server apparatus 300 is described. The server apparatus 300 has the configuration of a typical computer. The server apparatus 300 includes a processor 301, a main memory unit 302, an auxiliary memory unit 303, and a communication unit 304. These are connected to each other by a bus. The main memory unit 302 and the auxiliary memory unit 303 are computer-readable recording media. The hardware configuration of the computer is not limited to the example depicted in FIG. 2. The components may be appropriately omitted, replaced or added.

The server apparatus 300 causes the processor 301 to load a program stored in the recording medium into a work area of the main memory unit 302 and execute the program, and to control each functional component and the like through execution of the program, thereby allowing a function satisfying a predetermined object to be achieved.

The processor 301 is, for example, a CPU (Central Processing Unit) or a DSP (Digital Signal Processor). The processor 301 controls the server apparatus 300 to perform the operations of various information processes. The main memory unit 302 includes, for example, a RAM (Random Access Memory) and a ROM (Read Only Memory). The auxiliary memory unit 303 is, for example, an EPROM (Erasable Programmable ROM), or a hard disk drive (HDD). The auxiliary memory unit 303 may include a removable medium, i.e., a portable recording medium. The removable medium is, for example, a disk recording medium, such as a USB (Universal Serial Bus) memory, a CD (Compact Disc) or a DVD (Digital Versatile Disc). The auxiliary memory unit 303 stores various programs, various data items and various tables, in the recording medium, in a freely readable and writable manner. The auxiliary memory unit 303 stores an operating system (OS), various programs, various tables, etc. The information stored in the auxiliary memory unit 303 may be stored in the main memory unit 302 instead. Alternatively, the information stored in the main memory unit 302 may be stored in the auxiliary memory unit 303.

The communication unit 304 is connected to another apparatus, and controls communication between the server apparatus 300 and the other apparatus. The communication unit 304 is, for example, a LAN (Local Area Network) interface board, or a wireless communication circuit for wireless communication. The LAN interface board or the wireless communication circuit is connected to the network N1, such as the Internet, which is a public communication network.

A series of processes executed by the server apparatus 300 can be executed by hardware, but can be executed by software instead.

Next, the user terminal 200 is described. The user terminal 200 is, for example, a small computer, such as a smartphone, a mobile phone, a tablet terminal, a personal information terminal, or a wearable computer (a smartwatch etc.). Note that the user terminal 200 may be a personal computer (PC) connected to the server apparatus 300 via the network N1, such as the Internet, which is a public communication network.

The user terminal 200 includes a processor 201, a main memory unit 202, an auxiliary memory unit 203, a display unit 204, an input unit 205, and a communication unit 206. The processor 201, the main memory unit 202, and the auxiliary memory unit 203 are analogous to the processor 301, the main memory unit 302 and the auxiliary memory unit 303 of the server apparatus 300. Accordingly, the description thereof is omitted. The display unit 204 is, for example, a liquid crystal display (LCD), an Electroluminescence (EL) panel or the like. The input unit 205 includes a touch panel, push buttons, etc. Furthermore, the input unit 205 may include a camera that allows videos and images to be input, and a microphone that allows audio to input. The communication unit 206 is, for example, a communication circuit for accessing the network N1 using a mobile communication service (a telephone communication network, such as of mobile phones, or wireless communication, such as WiFi) and for performing data communication with the server apparatus 300 and the like.

Next, the vehicle-mounted device 100 is described. The vehicle-mounted device 100 includes a processing unit 101, a communication unit 102, and a position detecting unit 103. The processing unit 101 is a computer that controls notification about predetermined information to the driver of the vehicle 10, and input of the input information from the driver. The processing unit 101 is made up of a microcomputer, for example. For example, the processing unit 101 can perform a navigation process of notifying the driver in the vehicle 10 of map information around the traveling position and of route information to the destination. For control by the processing unit 101, a predetermined functional component is controlled. This functional component can be achieved by executing a program stored in a memory unit, such as a ROM (Read Only Memory), by a CPU (Central Processing Unit).

The communication unit 102 is, for example, a communication circuit for accessing the network N1 using a mobile communication service and for data communicating with the server apparatus 300 and the like. The vehicle-mounted device 100 (vehicle 10) is connected to the network N1 by the communication unit 102. Information acquired by the communication unit 102 is transmitted to the processing unit 101. The position detecting unit 103 is a device that detects the traveling position of the vehicle 10 and is, for example, a GPS (Global Positioning System) device. The position of the vehicle 10 detected by the position detecting unit 103 is passed to the processing unit 101, and can be collected by the server apparatus 300 via the communication unit 102.

(Functional Configuration of Server Apparatus)

Figure 3:
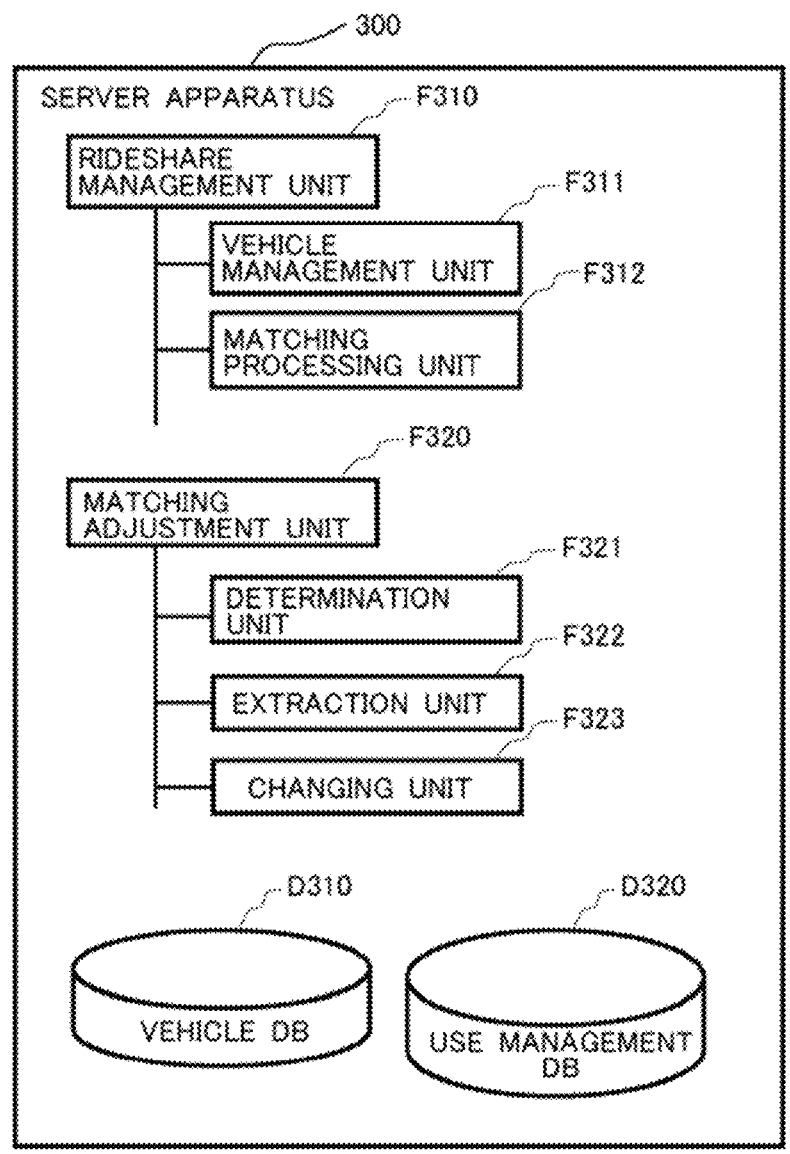
FIG. 3 depicts a functional configuration of a server apparatus that constitutes the rideshare system.

Next, the functional configuration of the server apparatus 300 is described with reference to FIG. 3. The server apparatus 300 includes, as functional components: a rideshare management unit F310; a matching adjustment unit F320; a vehicle database D310; and a use management database D320. The rideshare management unit F310 includes a vehicle management unit F311, and a matching processing unit F312. The matching adjustment unit F320 includes a determination unit F321, an extraction unit F322, and a changing unit F323. The processor 301 of the server apparatus 300 causes the computer program on the main memory unit 302 to execute the processes of the rideshare management unit F310, the vehicle management unit F311, the matching processing unit F312, the matching adjustment unit F320, the determination unit F321, the extraction unit F322, and the changing unit F323. Note that any of the functional components or a part of the process thereof may be executed by a hardware circuit. The vehicle database D310 and the use management database D320 are constructed through management of data stored in the auxiliary memory unit 303, the management being performed by a program of a database management system (DBMS) executed by the processor 301. The vehicle database D310 and the use management database D320 are, for example, relational databases.

Note that any of the functional components of the server apparatus 300 or a part of the process thereof may be executed by another computer connected to the network N1. For example, each process included in the rideshare management unit F310 and each process included in the matching adjustment unit F320 may be executed by different computers.

The rideshare management unit F310 obtains request information issued by the user (the first user in this embodiment) requesting a shared ride in any vehicle registered in the server apparatus 300. The vehicle management unit F311 included in the rideshare management unit F310 performs a process of managing the vehicles registered for matching. The matching processing unit F312 performs the matching process between the user and the vehicle. The vehicle management unit F311 generates information related to the vehicle provided for rideshare (vehicle information), and registers the information in the vehicle database D310. The matching processing unit F312 can match up the user with the vehicle using the publicly known technique. Subsequently, the rideshare management unit F310 requests the first user and the driver of the vehicle 10 to approve the matching, as described above. Specifically, the rideshare management unit F310 transmits information related to the approval request to the user terminal 200 of the first user and the vehicle-mounted device 100 of the vehicle 10. Both the approvals of the matching finally determine the matching between the user and the vehicle 10. Furthermore, the rideshare management unit F310 generates information related to rideshare use management (use management information), and registers the information in the use management database D320.

Here, the vehicle database D310 is a database that stores the vehicle information that is on the vehicles provided for rideshare and is managed by the server apparatus 300. The vehicle database D310 includes a vehicle information table depicted in FIG. 4. Note that information stored in the vehicle information table is not limited to the example depicted in FIG. 4. A field can be appropriately added, changed and removed.

The vehicle information table depicted in FIG. 4 includes the fields of the vehicle number, driver ID, vehicle type, traveling schedule, rideshare reservation, execution flag, traveling position, and destination. The vehicle number is identification information for identifying the vehicle 10, which is a vehicle registered for rideshare. The driver ID is an ID for identifying the driver driving the vehicle. Basically, according to the rideshare by the server apparatus 300, the vehicle is associated with a specific driver. Accordingly, the combination between the vehicle number and the driver ID is fixed. The vehicle type field stores information indicating the type of the vehicle. The traveling schedule field stores information that is registered by the driver of the vehicle and is used for matching. The rideshare reservation field stores information related to a reservation of rideshare through the vehicle. The information related to rideshare reservation is, for example, information related to the time or place at which a rideshare-user is allowed to board, or information related to the destination to which the user desires to travel or related to the desired arrival time thereto or the like. The execution flag field stores information indicating whether the rideshare is in execution by the vehicle or not. Accordingly, the rideshare reservation field is updated by the rideshare management unit F310 upon issuance of a reservation request by the user. After the reserved rideshare is executed or completed, the reservation information is removed from the rideshare reservation field. The execution field is also updated every time the rideshare by the vehicle is executed or completed.

The traveling position field stores the position information indicating the position where the vehicle is traveling. As for the position information on the vehicle, the position information detected by the position detecting unit 103 included in the vehicle-mounted device 100 of the vehicle is transmitted to the server apparatus 300 via the communication unit 102, thereby allowing the vehicle management unit F311 to update the traveling position field of the corresponding vehicle. The destination field stores the position information indicating the destination of the travel of the vehicle. For example, if the navigation process is executed in the vehicle, the information on the travel destination set for the process is transmitted to the server apparatus 300 via the communication unit 102, thereby allowing the vehicle management unit F311 to update the destination field of the corresponding vehicle. The vehicle management unit F311 may determine the destination of the vehicle on the basis of the traveling schedule field information, and input the destination into the destination field. Note that if the information on the traveling position or the destination is collected in the server apparatus 300 via the network, the transmission interval may be appropriately set in consideration of the communication load of the entire rideshare system 1, the freshness of the information in the vehicle database D310 or the like.

Next, the use management database D320 is described. Here, the use management database D320 is a database that stores the use management information. The use management database D320 includes a management information table depicted in FIG. 5. Note that information stored in the management information table is not limited to the example depicted in FIG. 5. A field can be appropriately added, changed and removed.

The management information table depicted in FIG. 5 includes the fields of the driver ID, the user ID, the vehicle number, the place where the user is scheduled to board the vehicle 10 (boarding place), the time when the user is scheduled to board the vehicle 10 (scheduled boarding time), the travel destination of the user, the arrival time desired by the user (desired arrival time), a passenger indicating presence or absence of another passenger at the time of boarding, and a completion flag indicating whether the rideshare is completed or not. The driver ID and the vehicle number are the same as those in the vehicle database. Accordingly, the description thereof is omitted. The user ID is an ID for identifying the user riding in the vehicle. Here, rideshare user information that includes the driver ID and the user ID is further managed by an individual table. The table includes the user's contact destination and the like. The contact destination is, for example, the user's mobile phone number or email address. The driver ID is preliminarily associated with the identification information (vehicle number) on the vehicle 10 in the server apparatus 300.

The information on the fields of the boarding place, scheduled boarding time, travel destination, desired arrival time, and passenger is information that is set by the matching processing unit F312 and is approved by the vehicle and the user. The example depicted in FIG. 5 indicates the use management information during execution of the rideshare depicted in FIG. 1. According to the use management information, first, a user C001 is scheduled to board one vehicle identified by a vehicle number X10 at 8:00 at a point f, and a user C002 is then scheduled to board this vehicle at 8:30 at point h. When the user C001 boards the vehicle, no other users do not ride the vehicle. Accordingly, "ABSENT" is input into the passenger field. On the other hand, when the user C002 boards the vehicle, the user C001 has already been riding the vehicle. Accordingly, "PRESENT" is input into the passenger field. The vehicle then travels to the destination point g and allows the user C001 to alight, and further travels to the destination point e and allows the user C002 to alight. As for the vehicle identified by X20, it is scheduled that a user C003 is allowed to board the vehicle at a point p at a scheduled time 17:30 and is allowed to travel to a point q. Accordingly, the scheduled arrival time is 18:30. The completion flag field stores information indicating whether the rideshare is executed and completed or not. For example, the example depicted in FIG. 5 means that the rideshare of the users C001 and C002 in the vehicle X10 has been completed, but the rideshare of the user C003 in the vehicle X20 has not been completed yet and the state is in a reserved state.

Returning to FIG. 3, the matching adjustment unit F320 is herein described. Here, it can be preferable that the user's scheduled riding vehicle be changed in some incomplete cases among rideshare cases managed by the use management database D320 as described above. The matching adjustment unit F320 performs, with the determination unit F321, the extraction unit F322 and the changing unit F323, a process for adjusting the combination between the vehicle provided for rideshare in such cases and the user scheduled to ride the vehicle. In detail, the determination unit F321 determines whether to change the user's scheduled riding vehicle or not on the basis of the predetermined position information related to the user's boarding the vehicle before the rideshare scheduled boarding time. An example of the predetermined position information may be position information for determining the degree of deviation from the scheduled time, in consideration that too much deviation of the time when one of the user and the vehicle reaches the boarding place is not preferable. For example, information on the current position of the user or the current position of the vehicle may be adopted. Another example may be position information related to the environmental load applied to allow user to enjoy rideshare, in consideration that an excessively high environmental load is not preferable. For example, information on the boarding place or the current position of the vehicle may be adopted. Note that the details of the determination process by the determination unit F321 based on the predetermined position information are described later.

If the determination unit F321 determines that the user's scheduled riding vehicle is to be changed, the user is difficult to achieve the originally specified travel purpose. Accordingly, the extraction unit F322 extracts one or more candidate vehicles that serve as alternative candidates for achieving the travel purpose. The candidate vehicles extracted by the extraction unit F322 may be vehicles that contribute to the user's travel to the travel destination. The extraction condition is not limited to a condition that allows the user to board at the originally scheduled boarding position or to alight directly at the travel destination. The details of the extraction process by the extraction unit F322 are described later. After the user approves the candidate vehicle extracted by the extraction unit F322, the changing unit F323 changes the user's scheduled riding vehicle from the originally specified vehicle to the vehicle approved from among the candidate vehicles on the basis of the approval result, and reflects the change in the use management database D320. For example, in a case where the scheduled riding vehicle for the user C003 is changed in matching between the vehicle X20 and the user C003 indicated by the use management information table depicted in FIG. 5, the record of this matching is removed, and a record related to matching between a new vehicle and the user C003 is created.

(Plow of Processes)

Figure 6:
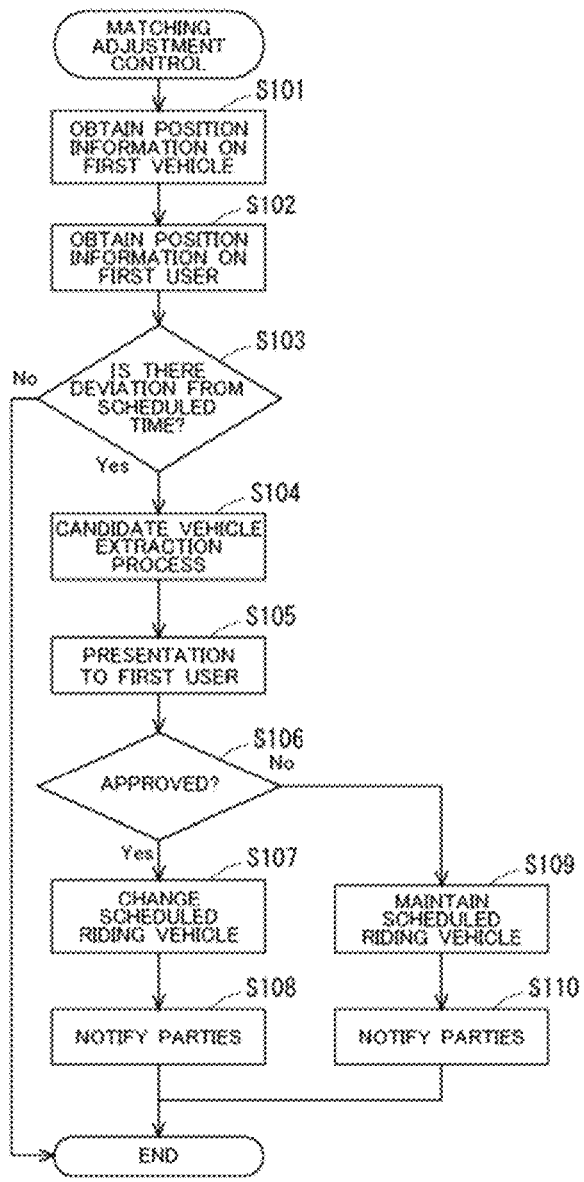
FIG. 6 is a first flowchart of matching adjustment control executed by the server apparatus.
Figure 7:
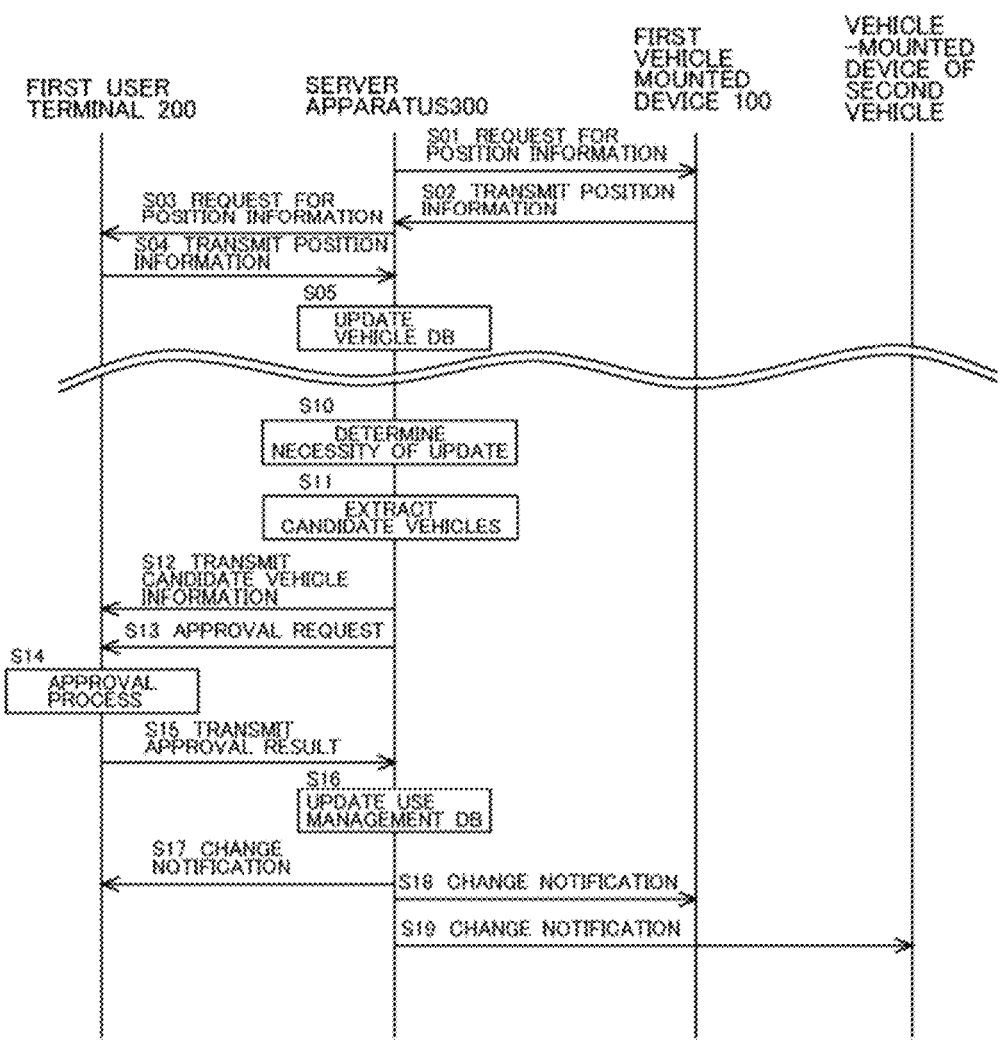
FIG. 7 depicts a flow of processes between a user terminal, a server apparatus, and vehicle-mounted devices of related vehicles when the matching adjustment control is performed.

The flow of the process for adjusting the combination between the user and the vehicle that have been already matched by the matching processing unit F312 (hereinafter, also called "matching adjustment process") in the rideshare system 1 of this embodiment is described with reference to FIGS. 6 and 7. In this embodiment, the matching adjustment process is executed by the matching adjustment unit F320, the determination unit F321 included therein, the extraction unit F322, and the changing unit F323. The flow of the process is illustrated in the flowchart of FIG. 6. The adjusting method illustrated therein is an example of the riding vehicle adjusting method. FIG. 7 depicts the flow of processes between the user terminal 200, the server apparatus 300, and the vehicle-mounted device of the related vehicle during execution of the matching adjustment control by the matching adjustment unit F320. Note that in the following embodiments, the vehicle having already been matched by the matching processing unit F312 is adopted as the first vehicle 10, and the vehicle-mounted device mounted thereon is adopted as the first vehicle-mounted device 100. The user (that is, the user scheduled to ride the first vehicle 10) combined with the first vehicle 10 is called the first user. The user terminal is called the first user terminal 200.

The matching adjustment control depicted in FIG. 6 is repetitively executed at predetermined time intervals for each combination between the vehicle and the user corresponding to a rideshare record for which rideshare has not been completed yet (i.e., a record where a completion flag field of the management information table is "INCOMPLETE") in the use management information managed by the use management database D320. In this embodiment, the combination is called "adjustment target combination." For example, based on the information management table depicted in FIG. 5, the combination between the vehicle X20 and the user C003 is regarded as the adjustment target combination. The matching adjustment control is performed for the adjustment target combination. In this case, the vehicle X20 is adopted as the first vehicle 10, and the user C003 is adopted as the first user. Each process of the matching adjustment control is performed before the scheduled time related to the adjustment target combination.

FIG. 7 depicts, in addition to exchange between devices during execution of the matching adjustment control, also collection of information related to the vehicle and the user of the adjustment target combination by the server apparatus 300, that is, the flows of the process of obtaining the position information on the first vehicle 10 and the process of obtaining the position information on the first user. In S01, the server apparatus 300 transmits a request signal for the position information on the first vehicle 10 to the vehicle-mounted device 100 of the first vehicle 10. In S02, the vehicle-mounted device 100 having received the request signal issues a response about the position information detected by the position detecting unit 103 to the server apparatus 300. Likewise, in S03, the server apparatus 300 transmits a request signal of the position information to the user terminal 200 of the first user. In S04, the user terminal 200 having received the request signal issues, to the server apparatus 300, a response about the position information detected by the position information detecting function, such as of the GPS device, that the user terminal 200 has. As described above, in S05, the server apparatus 300 collects the position information on each adjustment target combination between the first vehicle 10 and the first user. Note that the collection of the information related to the first vehicle 10 is performed by the vehicle management unit F311 as described above. The position information on the first vehicle 10 is stored in the traveling position field of the vehicle information table. The collection of information related to the first user is performed by the rideshare management unit F310. The position information on the first user is stored in a main memory included in the server apparatus 300. The collection of these pieces of position information is executed at predetermined time intervals. At every execution, the stored position information is updated.

The matching adjustment control depicted in FIG. 6 is herein described. First, in S101, the matching adjustment unit F320 obtains the position information on the first vehicle 10 from the vehicle information table. In S102, the matching adjustment unit F320 obtains the position information on the first user from the main memory of the server apparatus 300.

Subsequently, in S103, based on the position information on the first vehicle 10 obtained in S101 and the position information on the first user obtained in S102, the determination unit F321 determines whether or not the first vehicle 10 and the first user reach the rendezvous place for rideshare, that is, the scheduled place where the first user boards the first vehicle (the first boarding place), with a deviation of a predetermined time period or longer from the scheduled boarding time. Here, the cases of arrival with a deviation of the predetermined time period or longer from the scheduled time include a case of arrival with a delay from the scheduled time, and a case of arrival before the scheduled time. Each case is separately, specifically described.

(1) Case of Arrival with Delay from Scheduled Time

In this case, cases are considered where the first vehicle 10 reaches the first boarding place with a delay owing to road traffic situations and the like and where the first vehicle 10 reaches the first boarding place with a delay owing to occurrence of something to do in a process in which the first user travels toward the first boarding place. In each of the cases, the opposite party having reached the first boarding place earlier is caused to wait, and the behavior is limited, which is unfavorable accordingly. In such cases, it is believed that it can sometimes be preferable that the combination between the first vehicle 10 and the first user having already been matched is canceled and matching is newly performed.

Specifically, the determination unit F321 calculates a time at which the first vehicle 10 is expected to reach the first boarding place, on the basis of the position information on the first vehicle 10. For example, the expected arrival time is calculated in consideration of the distance from the current position of the first vehicle 10 to the first boarding place, the average speed of the first vehicle 10, the traffic situations (traffic jam situations) on the route to the first boarding place and the like. If the calculated expected arrival time delays by the predetermined time period or longer from the scheduled time, it is affirmatively determined in S103. If the delay is shorter than the predetermined time period, it is negatively determined. Note that the predetermined time period is appropriately set in consideration of the allowable degree of causing the opposite party to wait. According to another method, the determination unit F321 calculates a time at which the first user is expected to reach the first boarding place, on the basis of the position information on the first user. For example, the expected arrival time is calculated, in consideration of the distance from the current position of the first user to the first boarding place, the average walking speed of the first user, and the like. If the calculated expected arrival time delays by the predetermined time period or longer from the scheduled time, it is affirmatively determined in S103. If the delay is shorter than the predetermined time period, it is negatively determined.

(2) Case of Arrival Earlier than Scheduled Time

In such cases, it can be considered that the arrival of the first vehicle 10 at the first boarding place is sometimes advanced, and the arrival of the first user at the first boarding place is sometimes advanced. In each case, arrival of the opposite party is to be waited for until the scheduled time. During this time period, the behavior of the party whose arrival is advanced is limited. If another transportation of the first user is found, it is believed that it is sometimes preferable that the combination between the first vehicle 10 and the first user having already been matched be canceled and matching be newly performed in the case where the arrival of the first user is advanced or the case where the arrival of the first vehicle 10 is advanced.

Specifically, the determination unit F321 calculates a time at which the first vehicle 10 is expected to reach the first boarding place, on the basis of the position information on the first vehicle 10. The calculation of the expected arrival time is analogous to the calculation in the aforementioned (1) the case of arrival with a delay from the scheduled time. If the calculated expected arrival time is advanced by at least the predetermined time period from the scheduled time, it is affirmatively determined in S103. If the advancement is shorter than the predetermined time period, it is negatively determined. Note that the predetermined time period is appropriately set in consideration of the allowable degree of waiting for the arrival of the opposite party, the disadvantages of the opposite party for whom the matching combination is canceled or the like. According to another method, the determination unit F321 calculates a time at which the first user is expected to reach the first boarding place, on the basis of the position information on the first user. The calculation of the expected arrival time is analogous to the calculation in the aforementioned (1) the case of arrival with a delay from the scheduled time. If the calculated expected arrival time is advanced by at least the predetermined time period from the scheduled time, it is affirmatively determined in S103. If the advancement is shorter than the predetermined time period, it is negatively determined.

If it is affirmatively determined in S103, the processing proceeds to S104. If it is negatively determined in S103, this control is finished. Note that the process of S103 depicted in FIG. 6 is illustrated as the process of S10 in FIG. 7, that is, the process of determination of necessity of changing the matching combination. Next, the process of S104 is described. In S104, the candidate vehicle extraction process is performed by the extraction unit F322. Here, the candidate vehicle is a rideshare vehicle serving as an alternative candidate for supporting the travel of the first user who is to lose the transportation when the combination of the first vehicle 10 and the first user according to the adjustment target combination affirmatively determined in S103 is canceled. The extraction unit F322 extracts one or more vehicles as candidate vehicles from among the vehicles that are registered in the vehicle database D310 and are provided for rideshare.

Figure 8:
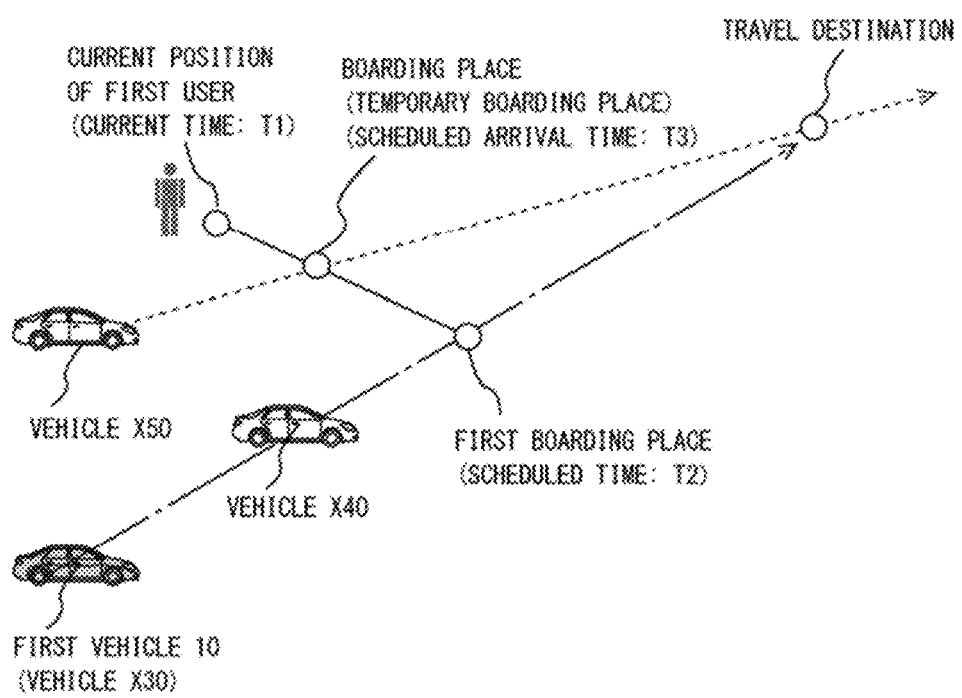
FIG. 8 is a first diagram for illustrating a method of extracting a candidate vehicle that is extracted in the matching adjustment control.
Figure 9:
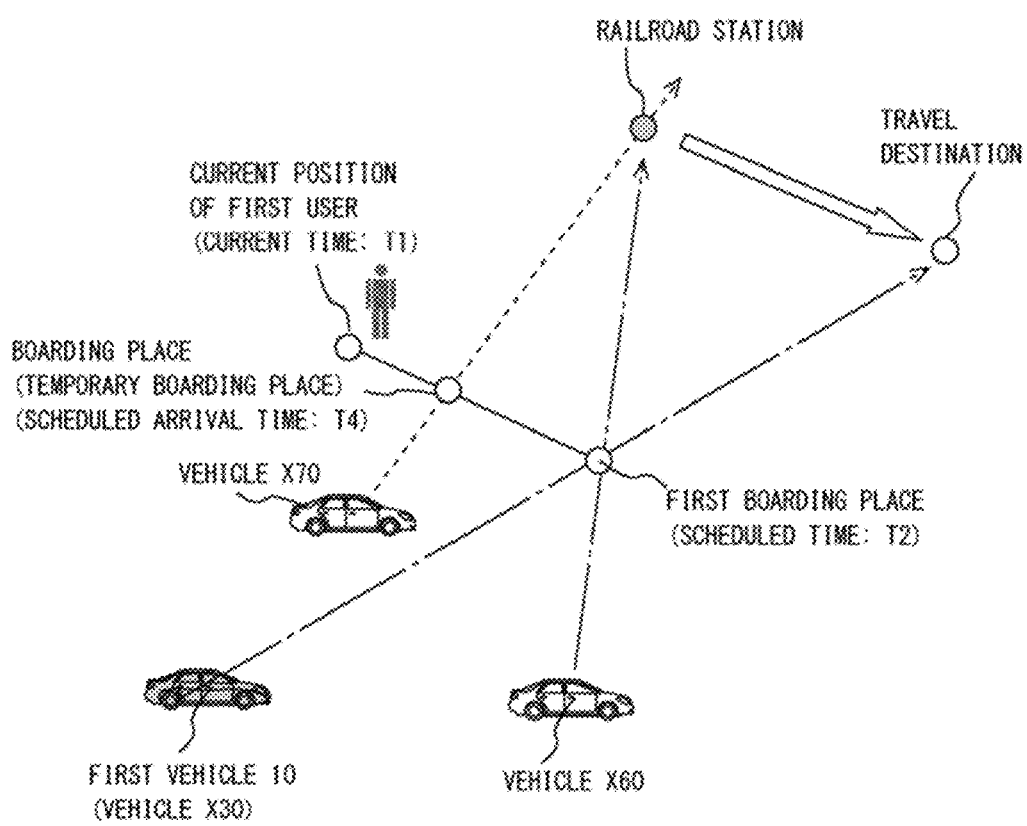
FIG. 9 is a second diagram for illustrating a method of extracting a candidate vehicle that is extracted in the matching adjustment control.

Here, the extraction of the candidate vehicles by the extraction unit F322 is described with reference to FIGS. 8 and 9. FIGS. 8 and 9 schematically illustrate the positions of the first user and the first vehicle 10 at a current time T1, the first boarding place set for the rideshare for both the parties, and the travel destination of the first user by the rideshare. In this embodiment, it is assumed that the arrival of the first vehicle 10 at the first boarding place is determined to delay by the predetermined time period from a scheduled time T2 (affirmatively determined in F103).

(1) Extraction Mode Depicted in FIG. 8

FIG. 8 depicts two extraction modes. In the first extraction mode, the extraction unit F322 extracts the vehicle that allows the first user to board the vehicle at the first boarding place around the scheduled time T2 from among the vehicles registered in the vehicle database D310. Specifically, the extraction unit F322 temporarily extracts the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the first boarding place at the scheduled time T2 or therearound and can travel to the travel destination of the first user are extracted as the candidate vehicles from among the temporarily extracted vehicles. For example, the vehicle X40 depicted in FIG. 8 has the same destination as the travel destination of the first user. The time when the vehicle X40 is expected to reach the first boarding place from the current position can be a time around the scheduled time T2. Accordingly, the extraction unit F322 can extract the vehicle X40 as the candidate vehicle. Note that the calculation method described above is applicable to calculation of the expected arrival time of the vehicle X40 to the first boarding place.

In the second extraction mode depicted in FIG. 8, the extraction unit F322 extracts the vehicle that allows the first user to board the vehicle at the temporary boarding place from among the vehicles registered in the vehicle database D310. The temporary boarding place is a boarding place which is any place from the current position of the user to the first boarding place and at which the user can board the vehicle. The extraction unit F322 extracts one or more candidates for temporary boarding places in a process of the first user's traveling from the current position to the first boarding place, together with a time T3 when the first user is expected to reach the place. In consideration of the candidate position and the expected arrival time T3 thereat, the candidate vehicles are extracted. Specifically, the extraction unit F322 temporarily extracts the vehicles that are determined as vehicles without any reservation provided for rideshare at the expected arrival time T3 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the temporary boarding place at the expected arrival time T3 or therearound and can travel to the travel destination of the first user are extracted as the candidate vehicles from among the temporarily extracted vehicles.

For example, the vehicle X50 depicted in FIG. 8 has the destination reachable by way of the travel destination of the first user, and the time when the vehicle X50 is expected to reach the temporary boarding place from the current position can be a time around the expected arrival time T3. Accordingly, the extraction unit F322 can extract the vehicle X50 as the candidate vehicle. Note that the calculation method described above is applicable to calculation of the expected arrival time of the vehicle X50 to the temporary boarding place. As described above, in the second extraction mode, the candidate vehicle is extracted without limitation to the first user's boarding at the first boarding place. Accordingly, the travel to the travel destination by the first user who is to lose the transportation is more preferably supported.

(2) Extraction Mode Depicted in FIG. 9

FIG. 9 depicts third and fourth extraction modes that are other two extraction modes. In the third extraction mode, the extraction unit F322 extracts the vehicle that allows the first user to board at the first boarding place around the scheduled time from among the vehicles registered in the vehicle database D310. Specifically, the extraction unit F322 temporarily extracts the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles which can reach the first boarding place at the scheduled time T2 or therearound and which can travel to a predetermined alighting place that is different from the travel destination of the first user and can allow travel to the travel destination by another transportation (e.g., a railroad, bus, etc.) are extracted as candidate vehicles from among the temporarily extracted vehicles. The predetermined alighting place is a place for allowing the first user to alight the rideshare vehicle and board another transportation. For example, a railroad station, a bus stop, etc. can be exemplified. For example, the vehicle X60 depicted in FIG. 9 has a destination that is a railroad station allowing the first user to travel to the travel destination. The time when the vehicle X60 is expected to reach the first boarding place from the current position can be a time around the scheduled time T2. Accordingly, the extraction unit F322 can extract the vehicle X60 as the candidate vehicle. Note that the calculation method described above is applicable to calculation of the expected arrival time of the vehicle X60 to the first boarding place. As described above, according to the third extraction mode, the first user is not allowed to travel in the rideshare vehicle directly to the travel destination, but can travel to the travel destination as a result. Accordingly, the travel to the travel destination by the first user, who is to lose the transportation, can be more preferably supported.

In the fourth extraction mode depicted in FIG. 9, the extraction unit F322 extracts the vehicle that allows the first user to board the vehicle at the temporary boarding place from among the vehicles registered in the vehicle database D310. The temporary boarding place is as described in the second extraction mode. The extraction unit F322 extracts one or more candidates for temporary boarding places in a process of the first user's traveling from the current position to the first boarding place, together with a time T4 when the first user is expected to reach the place. In consideration of the candidate position and the expected arrival time T4 thereat, the candidate vehicles are extracted. Specifically, the extraction unit F322 temporarily extracts the vehicles that are determined as vehicles without any reservation provided for rideshare at the expected arrival time T4 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the temporary boarding place at the expected arrival time T4 or therearound and can travel to the predetermined alighting place (railroad station) are extracted as the candidate vehicles from among the temporarily extracted vehicles.

For example, the vehicle X70 depicted in FIG. 9 has the destination reachable by way of the predetermined alighting place, and the time when the vehicle X70 is expected to reach the temporary boarding place from the current position can be a time around the expected arrival time T4. Accordingly, the extraction unit F322 can extract the vehicle X70 as the candidate vehicle. Note that the calculation method described above is applicable to calculation of the expected arrival time of the vehicle X70 to the temporary boarding place. As described above, according to the fourth extraction mode, the first user is not allowed to travel in the rideshare vehicle directly to the travel destination, but can travel to the travel destination as a result, and extracts the candidate vehicle without limitation to the first user's boarding the vehicle at the first boarding place. Accordingly, the travel to the travel destination by the first user, who is to lose the transportation, can be more preferably supported.

Figure 10:
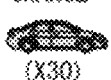
FIG. 10 depicts an example of a display screen that is displayed on the user terminal in the matching adjustment control, for proposing that a rideshare vehicle is to be changed.

Note that the process of S104 depicted in FIG. 6 is illustrated as the process of S11 in FIG. 7, that is, the process of extracting the candidate vehicles. Next, the process of S105 is described. In S105, the matching adjustment unit F320 presents the candidate vehicles extracted by the process of S104, to the user terminal 200 of the first user. FIG. 10 depicts an example of a list of the candidate vehicles displayed on the display unit 204 of the user terminal 200.

In the display example depicted in FIG. 10, the vehicle type, the boarding place, the scheduled time for boarding, and other related information (remark information), which are pieces of information related to the first vehicle 10 before change, are displayed in an upper area. Furthermore, analogous related information on each of the extracted candidate vehicles is displayed therebelow. Specifically, the related information on the vehicle X30, which is the first vehicle 10, is displayed in the upper area, where the first user can identify the delay in arrival of the first vehicle 10 at the first boarding place. The pieces of related information on the candidate vehicles X40, X50, X60 and X70 extracted in the first, second, third and fourth extraction modes described above are sequentially displayed therebelow. The first user can identify that the boarding place is changed from the originally specified first boarding place, for the candidate vehicles X50 and X70, and can identify that the alighting place is not the originally specified travel destination but is a railroad station, for the candidate vehicles X60 and X70. Note that the information on the candidate vehicles presented to the first user may be information on the candidate vehicles extracted according to at least one extraction mode among the first, second, third and fourth extraction modes. Note that the process of S105 depicted in FIG. 6 is illustrated as a process of transmitting the candidate vehicle information, that is, the process of S12, and as a process for an approval request, that is, the process of S13, in FIG. 7.

The first user, for whom such candidate vehicles are presented, is to issue a response about whether to approve the presented candidate vehicles or not in consideration of the approval request transmitted from the server apparatus 300 in S13 (the approval process in S14 depicted in FIG. 7). Specifically, the first user operates a checkbox disposed corresponding to each candidate vehicle through the input unit 205 of the user terminal 200, specifically, on the display unit 204 that is a touch panel, to approve the candidate vehicle desired to be changed from the first vehicle 10, thus expressing an intention of approving the change in rideshare vehicle. Note that in a case where the first user does not desire to change the rideshare vehicle, the checkbox corresponding to a display of "Do not change rideshare vehicle" displayed at the bottom of the display unit 204 is operated, thus expressing an intention of a denial of change. A candidate vehicle approval response by the first user as described above is transmitted from the user terminal 200 to the server apparatus 300 (an approval result transmission process in S15 depicted in FIG. 7).

The description is returned to the matching adjustment control in FIG. 6. After the process of S105, it is determined whether the candidate vehicle is approved by the first user or not in S106. Specifically, based on the approval result transmitted back to the server apparatus 300 in S15 of FIG. 7, the determination in S106 is performed. In the case of this embodiment, if any of the candidate vehicles X40 to X70 is selected and approved by the first user, it is affirmatively determined in S106. On the contrary, if change in rideshare vehicle is denied by the first user, it is negatively determined in S106.

If it is affirmatively determined in S106, the processing proceeds to S107. In S107, the scheduled riding vehicle for the first user is changed by the changing unit F323 from the first vehicle 10 to one candidate vehicle approved by the first user. Specifically, the changing unit F323 removes the original record that combines the first user with the first vehicle 10 in the management information table in the use management database D320, and adopts the approved candidate vehicle as a newly scheduled riding vehicle and generates a record that combines the first user with the second vehicle. The process of S107 is illustrated as the process of S16 in FIG. 7, that is, the process of updating the use management database D320. Subsequently, in S108, a notification about the change in the scheduled riding vehicle for the first user is issued for each of the parties related to the change, that is, the first user, the first vehicle 10 and the second vehicle. Specifically, information on a notification about the content of change is transmitted to the user terminal 200 of the first user, the vehicle-mounted device 100 of the first vehicle 10, and the vehicle-mounted device of the second vehicle (a process of change notification in S17, S18 and S19 in FIG. 7).

On the other hand, if it is negatively determined in S106, the processing proceeds to S109. In S109, the scheduled riding vehicle related to the first user is not changed by the changing unit F323. Subsequently, in S110, the party related to the process of S109, that is, the first user is notified that the change is not performed.

Note that the matching adjustment control described above does not mention the approval on the second vehicle side, the approval being made by the first user with respect to change in the scheduled riding vehicle for the first user. Before change in the scheduled riding vehicle in S107, the approval on the second vehicle side, that is, acceptance of allowing the first user to ride in the second vehicle may be confirmed. In a case where setting of negating the need of the approval process for the second vehicle is registered in the vehicle database D310, the second vehicle is changed to a newly scheduled riding vehicle at a time when the second vehicle is approved among the candidate vehicles presented by the first user.

According to the matching adjustment control depicted in FIG. 6 as described above, if the arrival of any of the first user and the first vehicle 10 at the first boarding place deviates from the scheduled time by a predetermined time period, the matching for rideshare is adjusted, thereby allowing the limitation to the behaviors of both the parties to be alleviated. Meanwhile, even if it is determined to change the scheduled riding vehicle for the first user, an alternative vehicle is extracted, thereby allowing the first user's travel to be preferably supported.

Second Embodiment

Figure 11:
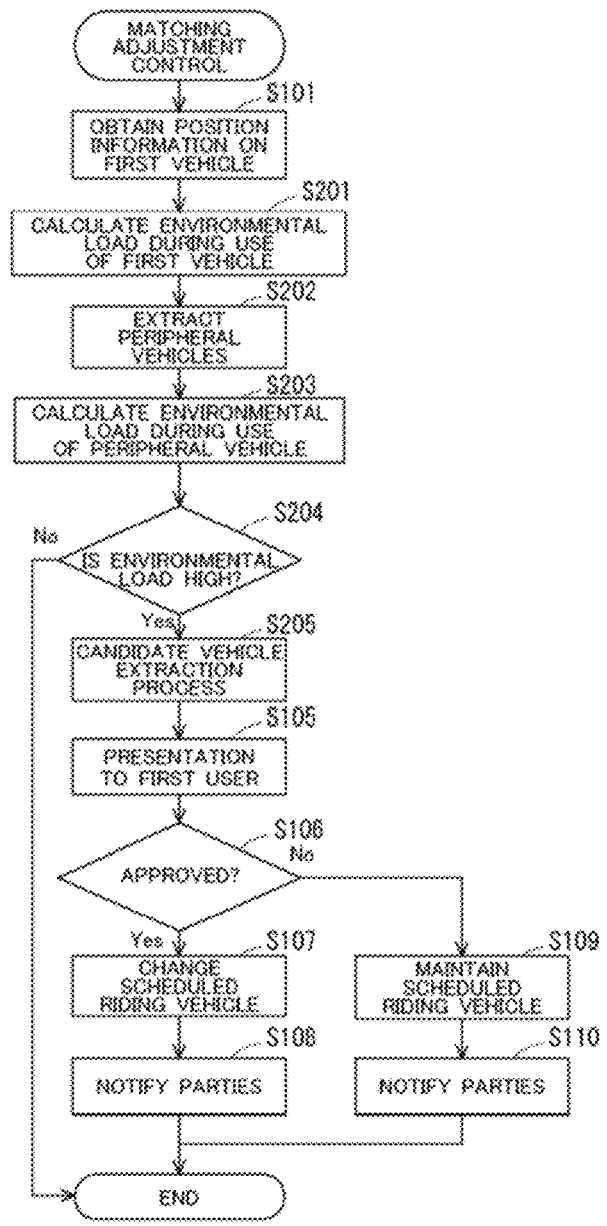
FIG. 11 is a second flowchart of the matching adjustment control executed by the server apparatus.

A second embodiment of the rideshare system 1 is described with reference to FIG. 11. FIG. 11 depicts the flow of the matching adjustment control according to this embodiment. Among the processes included in the matching adjustment control depicted in FIG. 11, the same processes as the processes of the matching adjustment control depicted in FIG. 6 are assigned the same reference numerals, and the detailed description thereof is omitted. In the matching adjustment control according to this embodiment, the position information on the first vehicle 10 is obtained in S101, and subsequently the value of a predetermined parameter related to the environmental load (hereinafter called "first parameter value") in a case where the first vehicle 10 is used for the first user's travel is calculated in S201. In this embodiment, for example, the predetermined parameter means that the higher the value is, the higher the environmental load is. The processes in S201 to S203 described later in this embodiment are executed by the matching adjustment unit F320. The predetermined parameter is a parameter representing the degree of the load by the user's travel on the environment and is, for example, the amount of $CO_2$ gas emitted to the outside by the travel of the vehicle, the amount of energy used for the travel or the like. In this embodiment, the amount of emitted $CO_2$ gas is adopted as the predetermined parameter, and the following description is made.

The amount of emitted $CO_2$ gas, which is the predetermined parameter, is calculated in consideration of the fuel consumption of the first vehicle 10, the distance from the current position of the first vehicle 10 to the travel destination of the first user, the road congestion situation and the like. The higher the fuel consumption is, the more the amount of $CO_2$ gas emitted during the travel increases. The longer the travel distance by the vehicle 10 is, the more the amount of emitted $CO_2$ gas increases. Typically, if the vehicle enters a traffic jam and reduces the traveling speed, the amount of emitted $CO_2$ gas increases. Here, the first user's travel is scheduled such that the vehicle 10 travels from the current position to the first boarding place, allows the first user to board there, and travels from the first boarding place to the travel destination. Here, based on the position information on the first vehicle 10 and the position information on the first boarding place, the first parameter value is calculated. Specifically, in a case where the distance from the current position to the first boarding place calculated from these pieces of position information is relatively long, or in a case where a traffic jam occurs on the route from the current position to the first boarding place, the first parameter value is calculated according to the degrees thereof. Furthermore, based on the position information on the first boarding place and the position information on the travel destination of the first user, the amount of emitted $CO_2$ gas related to the route from the first boarding place to the travel destination may be added to the first parameter value. After the process of S201 is finished, the processing proceeds to S202.

In S202, from among the vehicles registered in the vehicle database D310, vehicles that are around the first boarding place and allow the first user to ride the vehicles (hereinafter called "peripheral vehicles") are extracted. Specifically, the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table, are temporarily extracted. Furthermore, in consideration of the input information in the traveling position field and the input information in the destination field, vehicles that can reach the first boarding place at the scheduled time T2 or therearound and can travel to the travel destination of the first user are extracted as the peripheral vehicles from among the temporarily extracted vehicles. The number of extracted peripheral vehicles may be one or more. Subsequently, in S203, as with the first vehicle 10, for each of the peripheral vehicles extracted in S202, the value of the predetermined parameter (hereinafter called "peripheral parameter value") related to the environmental load if the peripheral vehicles are used for the first user's travel is calculated. The method of calculating the peripheral parameter value is the same as the method of calculating the first parameter value. Consequently, in S203, the degree of the environmental load in a case where the travel purpose of the first user is to be achieved using the peripheral vehicle, is calculated. In a case where the current position of the peripheral vehicle is different from the current position of the first vehicle 10, the distance from the current position to the first boarding place and the road situation on the route can be different. Accordingly, there is a possibility that the first parameter value does not coincide with the peripheral parameter value. After the process of S203 is finished, the processing proceeds to S204.

In S204, the determination unit F321 determines whether or not the environmental load in the case of use of the first vehicle 10 is higher than the environmental load in the case of possible use of the peripheral vehicle, that is, whether the first parameter value is higher than the peripheral parameter value or not. If it is affirmatively determined in S204, it means that the first user's travel using the first vehicle 10 has a high environmental load, and the scheduled riding vehicle is to be changed. Accordingly, the process of S205 is subsequently performed. On the other hand, if it is negatively determined in S204, this control is finished. In a case of multiple peripheral vehicles, each peripheral vehicle is compared with the first vehicle 10 in view of the environmental load and the determination process in S204 is performed. In a case where the first vehicle 10 has a higher environmental load than the peripheral vehicles even if the number of first vehicles is one, it is affirmatively determined in S204.

In S205, the candidate vehicle extraction process is performed by the extraction unit F322. Here, the candidate vehicle is regarded as the peripheral vehicle having a smaller peripheral parameter value calculated in S203 than the first parameter value related to the first vehicle 10 among the peripheral vehicles extracted in S202. As the candidate vehicles, all the peripheral vehicles having the peripheral parameter value lower than the first parameter value may be extracted, or some peripheral vehicles including the peripheral vehicle having the lowest peripheral parameter value may be extracted. After the process of S205 is finished, the previously described processes of S105 and thereafter are performed.

As described above, according to the matching adjustment control depicted in FIG. 11, if there is a possibility of reducing the environmental load in the case where the first user travels using the first vehicle 10 with the scheduled riding vehicle being changed, matching for rideshare is adjusted. As a result, also when the scheduled riding vehicle for the first user is determined to be changed, an alternative vehicle can be extracted to support the first user's travel preferably.

Third Embodiment

Figure 12:
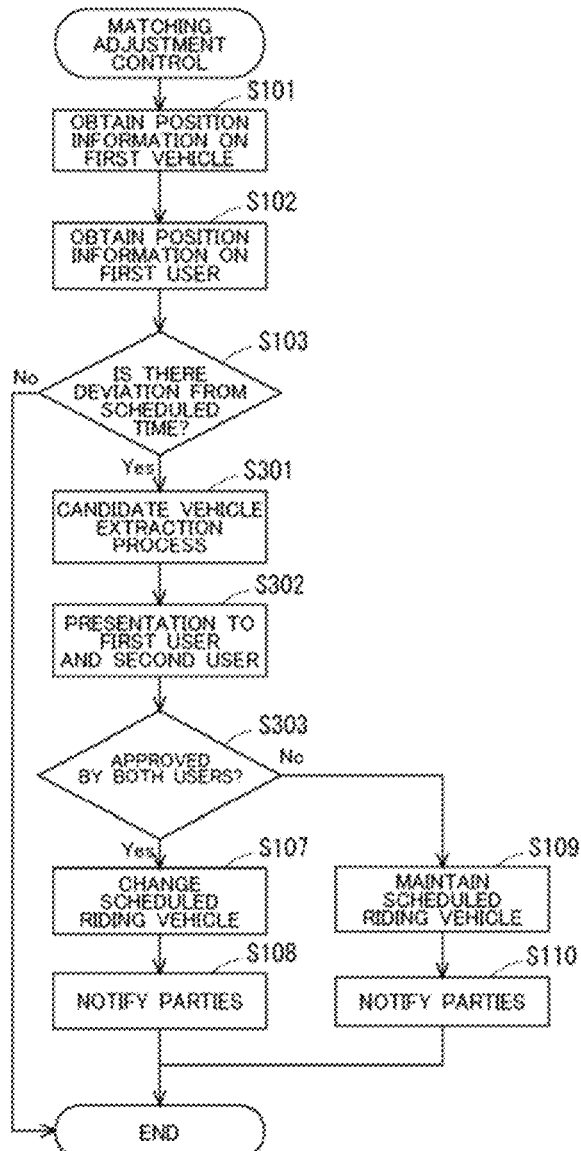
FIG. 12 is a third flowchart of the matching adjustment control executed by the server apparatus.
Figure 13:
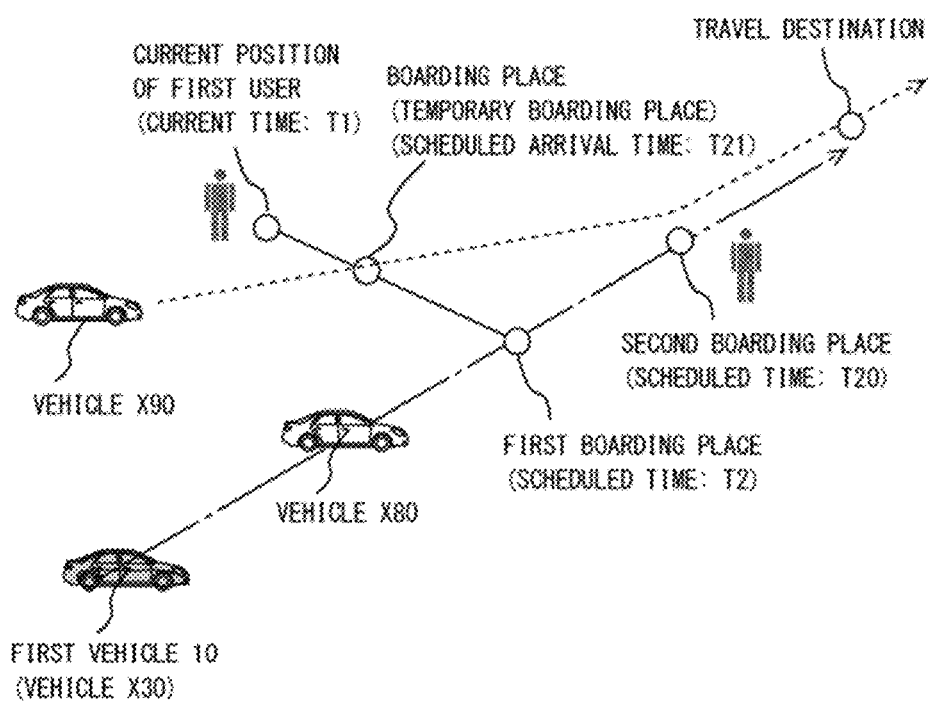
FIG. 13 is a third diagram for illustrating the method of extracting a candidate vehicle that is extracted in the matching adjustment control.

A third embodiment of the rideshare system 1 is described with reference to FIGS. 12 and 13. FIG. 12 depicts the flow of the matching adjustment control according to this embodiment. Among the processes included in the matching adjustment control depicted in FIG. 12, the same processes as the processes of the matching adjustment control depicted in FIG. 6 are assigned the same reference numerals, and the detailed description thereof is omitted. FIG. 13 illustrates the candidate vehicle extraction mode. Here, in this embodiment, as for the rideshare through the first vehicle 10, it is scheduled that in addition to the first user, the second user also rides the first vehicle 10 and both users travel to the same travel destination. Accordingly, FIG. 13 schematically depicts, in addition to the positions of the first user and the first vehicle 10 at the current time T1, the first boarding place and the travel destination, also the second boarding place where the second user is scheduled to board the first vehicle 10. It is scheduled that the first vehicle 10 allows the first user to board the vehicle at the first boarding place at the scheduled time T2, subsequently, further allows the second user to board the vehicle at the second boarding place at the scheduled time T20, and then travels to the travel destinations of both the users. This schedule is recorded in the use management database D320. Accordingly, the adjustment target combination by the matching adjustment process is among three parties that are the first vehicle 10, the first user and the second user.

With the assumption of such a rideshare schedule, the matching adjustment control depicted in FIG. 12 is executed. According to the matching adjustment control, as to the arrivals of the first user and the first vehicle 10 at the first boarding place, in S103, the determination unit F321 determines presence or absence of a deviation from the scheduled time by a predetermined time period. If it is affirmatively determined there, the processing proceeds to S301. In S301, the candidate vehicle extraction process is performed by the extraction unit F322. Here, the adjustment target combination of this embodiment includes three parties that are the first vehicle 10, the first user and the second user. In consideration of this point, according to this embodiment, if it is affirmatively determined in S103, one or more vehicles serving as alternative candidates for both the first user and second user are extracted as candidate vehicles from among the vehicles that are provided for rideshare and registered in the vehicle database D310, irrespective of whether the second user boards the first vehicle 10 or not.

Here, the extraction of the candidate vehicles in S301 is described with reference to FIG. 13. FIG. 13 depicts fifth and sixth extraction modes that are two extraction modes. In the fifth extraction mode, the extraction unit F322 extracts the vehicle that allows the first user to board the vehicle at the first boarding place around the scheduled time T2 from among the vehicles registered in the vehicle database D310. Specifically, the extraction unit F322 temporarily extracts the vehicles that are determined as vehicles without any reservation provided for rideshare at the scheduled time T2 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the first boarding place at the scheduled time T2 or therearound and can travel to the second boarding place at the scheduled time T20 or therearound, and can travel to the travel destinations of the first user and the second user, are extracted as the candidate vehicles from among the temporarily extracted vehicles. For example, the vehicle X80 depicted in FIG. 13 has the same destination as the travel destinations of the first user and the second user. The time when the vehicle X80 is expected to reach the first boarding place from the current position can be a time around the scheduled time T2. The time when this vehicle is expected to reach subsequently the second boarding place can be a time around the scheduled time T20. Accordingly, the extraction unit F322 can extract the vehicle X80 as the candidate vehicle. Note that the calculation method described above is applicable to calculation of the expected arrival time of the vehicle X80 to the first boarding place and the second boarding place.

In the sixth extraction mode depicted in FIG. 13, the extraction unit F322 extracts the vehicle that allows the first user to board the vehicle at the temporary boarding place from among the vehicles registered in the vehicle database D310. The temporary boarding place is as described in the first embodiment. The extraction unit F322 extracts one or more candidates for temporary boarding places in a process of the first user's traveling from the current position to the first boarding place, together with a time $T21$ when the first user is expected to reach the place. In consideration of the candidate position and the expected arrival time $T21$ thereat, the candidate vehicles are extracted. Specifically, the extraction unit F322 temporarily extracts the vehicles that are determined as vehicles without any reservation provided for rideshare at the expected arrival time $T21$ from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the temporary boarding place at the expected arrival time $T21$ or therearound and can travel to the second boarding place at the scheduled time $T20$ or therearound, and can travel to the travel destinations of the first user and the second user, are extracted as the candidate vehicles from among the temporarily extracted vehicles.

For example, the vehicle X90 depicted in FIG. 13 has the destination that is a place reachable by way of the travel destinations of the first user and the second user. The time when the vehicle X90 is expected to reach the temporary boarding place from the current position can be a time around the expected arrival time $T21$. The time when this vehicle is expected to reach subsequently the second boarding place can be a time around the scheduled time $T20$. Accordingly, the extraction unit F322 can extract the vehicle X90 as the candidate vehicle. Note that the calculation method described above is applicable to calculation of the expected arrival time of the vehicle X90 to the temporary boarding place.

In S301, the candidate vehicles are extracted. Subsequently, in S302, the matching adjustment unit F320 presents the extracted candidate vehicles to the user terminals 200 of the first user and the second user. The presentation of the candidate vehicles is as depicted in FIG. 10. In a case where multiple candidate vehicles are present, the candidate vehicles are presented first to the first user. After the approval result is returned from the first user, it is preferable to present the approved candidate vehicles to the second user. Subsequently, in S302, it is determined whether both the first user and the second user have approved the candidate vehicle or not. If it is affirmatively determined in S303, the processes of S107 and thereafter are performed. In particular, in S107, the scheduled riding vehicle for the first user and the second user is changed by the changing unit F323 from the first vehicle 10 to the second vehicle that is one candidate vehicle approved by both the users. If it is negatively determined in S303, the processes of S109 and thereafter are performed.

As described above, according to this matching control, in conformity with the meeting situation between the first user and the first vehicle 10, the vehicle provided for rideshare is changed with respect collectively to the second user scheduled to board next together with the first user. That is, the integrated first and second users are not separated from each other, and both the users are collectively subjected to the matching process again. Accordingly, occurrence of a situation where the first user and the second user are allowed to travel separately in different vehicles can be avoided as much as possible. This contributes to the object of rideshare that reduces the environmental load due to the user's travel.

Also in this embodiment, the technical thought related to the third extraction mode and the fourth extraction mode described in the first embodiment is applicable to the candidate vehicle extraction. That is, the candidate vehicles allowing the first user and the second user to alight at the predetermined alighting place are extracted. As a result, the first user and the second user can travel to the travel destination. Consequently, the travels can be preferably supported.

Fourth Embodiment

Figure 14:
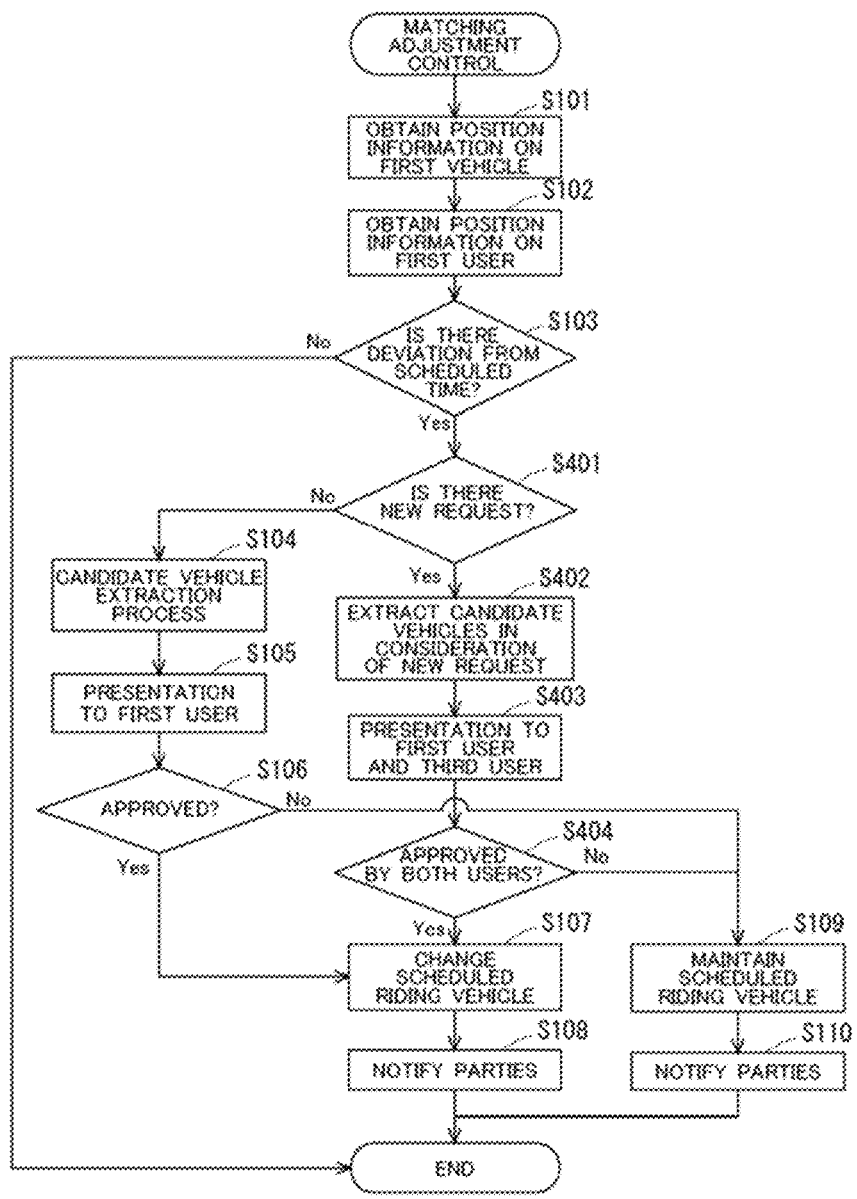
FIG. 14 is a fourth flowchart of the matching adjustment control executed by the server apparatus.
Figure 15:
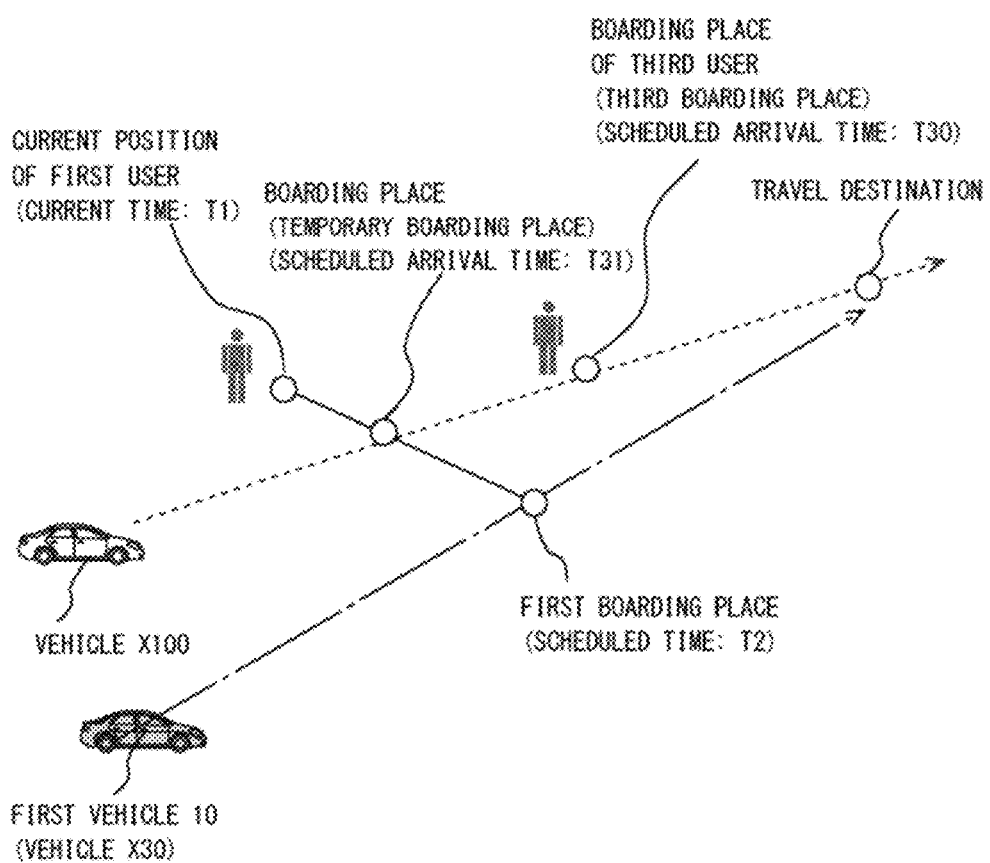
FIG. 15 is a fourth diagram for illustrating the method of extracting a candidate vehicle that is extracted in the matching adjustment control.

A fourth embodiment of the rideshare system 1 is described with reference to FIGS. 14 and 15. FIG. 14 depicts the flow of the matching adjustment control according to this embodiment. Among the processes included in the matching adjustment control depicted in FIG. 14, the same processes as the processes of the matching adjustment control depicted in FIG. 6 are assigned the same reference numerals, and the detailed description thereof is omitted. FIG. 15 illustrates the candidate vehicle extraction mode. Here, in this embodiment, as for the rideshare through the first vehicle 10, the first user is scheduled to travel to the travel destination, and this schedule is recorded in the use management database D320. Accordingly, the adjustment target combination by the matching adjustment process is between two parties that are the first vehicle 10 and the first user. In this embodiment, it is further assumed that at a time when the scheduled riding vehicle for the first user is changed, a request for using rideshare by a third user who is a new user in order to travel to the same travel destination as that of the first user is delivered to the rideshare system 1. Accordingly, FIG. 13 schematically depicts, in addition to the positions of the first user and the first vehicle 10 at the current time $T1$, the first boarding place and the travel destination, also a third boarding place where the third user desires to board the vehicle.

According to the matching adjustment control depicted in FIG. 14, as to the arrivals of the first user and the first vehicle 10 at the first boarding place, in S103, the determination unit F321 determines presence or absence of a deviation from the scheduled time by a predetermined time period. If it is affirmatively determined there, the processing proceeds to S401. In S401, at this time, it is determined whether a request for using a new rideshare vehicle has been issued to the rideshare system 1 or not. The new request is received by the rideshare management unit F310. If the new request has been delivered, it is affirmatively determined in S401. If the new request has not been delivered, it is negatively determined in S401. If it is affirmatively determined in S401, the processing proceeds to S402. If it is negatively determined, the processes of S104 and thereafter are performed. The processes in S104 and thereafter are the same as the processes in S104 and thereafter in the matching adjustment control depicted in FIG. 6.

Here, the processes of S402 and thereafter are described. In S402, in consideration of the new request, the extraction unit F322 extracts vehicles which serve as alternatives for allowing the first user to travel to the travel destination and which the third user intending to travel newly to the travel destination can ride are extracted as the candidate vehicles. The new request by the third user in this embodiment has content of intending to board the rideshare vehicle at the third boarding place different from the first boarding place at a scheduled time $T30$ and to travel to the travel destination identical to that of the first user.

The extraction of the candidate vehicles in S402 is described with reference to FIG. 15. FIG. 15 depicts a seventh extraction mode. In the seventh extraction mode, the extraction unit F322 extracts the vehicle that allows the first user to board the vehicle at the temporary boarding place from among the vehicles registered in the vehicle database D310. The temporary boarding place is as described in the first embodiment. The extraction unit F322 extracts one or more candidates for temporary boarding places in a process of the first user's traveling from the current position to the first boarding place, together with a time T31 when the first user is expected to reach the place. In consideration of the candidate position and the expected arrival time T31 thereat, the candidate vehicles are extracted. Specifically, the extraction unit F322 temporarily extracts the vehicles that are determined as vehicles without any reservation provided for rideshare at the expected arrival time T31 from the information on the rideshare reservation field of the vehicle information table depicted in FIG. 4 and are determined as vehicles not provided currently for rideshare from the information on the execution flag field of the vehicle information table. Furthermore, in consideration of the input information in the traveling position field and the input information in the destination field, vehicles that can reach the temporary boarding place at the expected arrival time T31 or therearound and can travel to the third boarding place at the scheduled time T30 or therearound, and can travel to the travel destinations of the first user and the third user, are extracted as the candidate vehicles from among the temporarily extracted vehicles.

For example, the vehicle X100 depicted in FIG. 15 has the destination that is a place reachable by way of the travel destinations of the first user and the third user. The time when the vehicle X100 is expected to reach the temporary boarding place from the current position can be a time around the expected arrival time T31. The time when the vehicle X100 is expected to reach the third boarding place can be a time around the scheduled time T30. Accordingly, the extraction unit F322 can extract the vehicle X100 as the candidate vehicle. Note that the calculation method described above is applicable to calculation of the expected arrival time of the vehicle X100 to the temporary boarding place and the third boarding place.

In S402, the candidate vehicles are extracted. Subsequently, in S403, the matching adjustment unit F320 presents the extracted candidate vehicles to the user terminals 200 of the first user and the third user. The presentation of the candidate vehicles is as depicted in FIG. 10. In a case where multiple candidate vehicles are present, the candidate vehicles are presented first to the first user. After the approval result is returned from the first user, it is preferable to present the approved candidate vehicles to the third user. Subsequently, in S404, it is determined whether both the first user and the third user have approved the candidate vehicle or not. If it is affirmatively determined in S404, the processes of S107 and thereafter are performed. In particular, in S107, the scheduled riding vehicle for the first user is changed by the changing unit F323 from the first vehicle 10 to the second vehicle that is one approved candidate vehicle. If it is negatively determined in S404, the processes of S109 and thereafter are performed.

As described above, according to this matching control, in conformity with the meeting situation between the first user and the first vehicle 10, the vehicle provided for rideshare is adjusted with respect collectively to the third user scheduled to newly board the vehicle together with the first user. Accordingly, the first user and the third user are collectively subjected to the matching process again. Consequently, occurrence of a situation where the first user and the third user are allowed to travel separately in different vehicles can be avoided as much as possible. This contributes to the object of rideshare that reduces the environmental load due to the user's travel.

Also in this embodiment, the technical thought related to the third extraction mode and the fourth extraction mode described in the first embodiment is applicable to the candidate vehicle extraction. That is, the candidate vehicles allowing the first user and the third user to alight at the predetermined alighting place are extracted. As a result, the first user and the third user can travel to the travel destination. Consequently, the travels can be preferably supported.

Other Embodiments

The embodiments described above are examples. The present disclosure can be appropriately changed and executed in a scope without departing from the gist thereof.

The processes and means described in this disclosure can be freely combined and executed unless a technical contradiction occurs.

The process described as what is performed by a single device or apparatus may be shared among multiple devices or apparatuses and executed. Alternatively, the processes described as what is performed by different devices or apparatuses may be executed by a single device or apparatus. In a computer system, a hardware configuration (server configuration) that executes each function can be flexibly changed.

The present disclosure can also be achieved by providing a computer with a computer program where the functions described in the embodiments are implemented, and by causing one or more processors included in the computer to read and execute the program. Such a computer program may be provided for the computer through a non-transitory computer readable storage medium connectable to a system bus of the computer, or provided for the computer via a network. The non-transitory computer readable storage medium may be, for example, any type of disk, such as a magnetic disk (floppy (registered trademark) disk, hard disk drive (HDD), etc.) or an optical disk (CD-ROM, DVD disc, Blu-ray disc, etc.), or a read only memory (ROM), a random access memory (RAM), EPROM, EEPROM, a magnetic card, a flash memory or an optical card, or any type of medium suitable for storing electronic instructions.

What is claimed is:

1. An information processing apparatus of a rideshare system, the information processing apparatus comprising a controller including a processor configured to execute:
   assigning a first vehicle of a plurality of vehicles in the rideshare system as a scheduled riding vehicle, and assigning a first boarding place, which is a location where a first user will meet the first vehicle at a scheduled time and the first user will board the first vehicle to travel to a destination;
   determining whether the first vehicle will reach the first boarding place at a time deviating by a predetermined time period or longer from the scheduled time based on (i) a current location of the first vehicle detected in real time by a global positioning system (GPS) device installed in the first vehicle, which is transmitted to the information processing apparatus from the GPS device, and (ii) navigation data of the first vehicle to travel to the first boarding place, which is transmitted from a processing device installed in the first vehicle that provides a navigation process for the first vehicle;
   in response to determining that the first vehicle will reach the first boarding place at the time deviating by the predetermined time period or longer from the scheduled time, determining, before the scheduled time occurs, to change the scheduled riding vehicle from the first vehicle to a different vehicle of the plurality of vehicles;

extracting one or more candidate vehicles of the plurality of vehicles serving as alternative vehicles for the first vehicle based on at least a current location of each of the one or more candidate vehicles detected in real time by a GPS device installed in each of the one or more candidate vehicles, which is transmitted to the information processing apparatus from the respective GPS device, in response to determining to change the scheduled riding vehicle from the first vehicle, and presenting the extracted one or more candidate vehicles on a user terminal for the first user; and in response to receiving approval from the user terminal for the first user of the presented one or more candidate vehicles, changing the scheduled riding vehicle from the first vehicle to a second vehicle that is one of the extracted one or more candidate vehicles of the plurality of vehicles.

2. The information processing apparatus according to claim 1, wherein the controller is configured to execute:

determining to change the scheduled riding vehicle assigned to the first user based on a value of a predetermined parameter related to an environmental load due to travel to the destination of the first user, when the value of the predetermined parameter, in a case of using the first vehicle, is calculated based on position information of the first boarding place and the position information of the first vehicle to have a higher environmental load than the value of the predetermined parameter in a case of using another vehicle of the plurality of vehicles other than the first vehicle, and extracting the one or more candidate vehicles from the plurality of vehicles that have a lower environmental load than the load in the case of using the first vehicle.

3. The information processing apparatus according to claim 1, wherein the controller is configured to execute extracting the one or more candidate vehicles from among at least any of one or more vehicles of the plurality of vehicles that allow the first user to board at the first boarding place and one or more vehicles of the plurality of vehicles that allow the first user to board at a temporary boarding place, which is any location that is located between a current position of the first user and the first boarding place.

4. The information processing apparatus according to claim 1, wherein the controller is configured to execute extracting, as the one or more candidate vehicles, vehicles that are to travel through a predetermined alighting place based on acquired information related to travel of another vehicle of the plurality of vehicles other than the first vehicle, the predetermined alighting place being a location where the first user alights from the approved one or more candidate vehicles and travels to the destination by another mode of transportation.

5. The information processing apparatus according to claim 1, wherein:

the first vehicle is scheduled to allow a second user to board at a second boarding place different from the first boarding place after the first user boards the first vehicle, and the controller is configured to execute:

extracting the one or more candidate vehicles to serve as alternative vehicles for both the first user and the second user irrespective of whether the second user is to ride in the first vehicle, in response to determining that the scheduled riding vehicle assigned to the first user is to be changed, and changing the scheduled riding vehicle assigned to the first user and the second user from the first vehicle to the second vehicle, based on receiving approvals for boarding the second vehicle by the first user and the second user.

6. The information processing apparatus according to claim 1, wherein the controller is configured to execute:

extracting the one or more candidate vehicles to serve as alternative vehicles for the first user and that a third user is to board at a third boarding place different from the first boarding place, in response to determining that the scheduled riding vehicle assigned to the first user is to be changed, and changing the scheduled riding vehicle assigned to the first user from the first vehicle to the second vehicle, based on receiving approvals for boarding the second vehicle by the first user and the third user, and assigning the scheduled riding vehicle for the third user to the second vehicle.

7. A riding vehicle adjusting method causing a computer to:

assign a first vehicle of a plurality of vehicles in the rideshare system as a scheduled riding vehicle, and assign a first boarding place, which is a location where a first user will meet the first vehicle at a scheduled time and the first user will board the first vehicle to travel to a destination;

determine whether the first vehicle will reach the first boarding place at a time deviating by a predetermined time period or longer from the scheduled time based on (i) a current location of the first vehicle detected in real time by a global positioning system (GPS) device installed in the first vehicle, which is transmitted to the information processing apparatus from the GPS device, and (ii) navigation data of the first vehicle to travel to the first boarding place, which is transmitted from a processing device installed in the first vehicle that provides a navigation process for the first vehicle;

in response to determining that the first vehicle will reach the first boarding place at the time deviating by the predetermined time period or longer from the scheduled time, determine, before the scheduled time occurs, whether to change the scheduled riding vehicle from the first vehicle to a different vehicle of the plurality of vehicles;

extract one or more candidate vehicles of the plurality of vehicles serving as alternative vehicles for the first vehicle based on at least a current location of each of the one or more candidate vehicles detected in real time by a GPS device installed in each of the one or more candidate vehicles, which is transmitted to the information processing apparatus from the respective GPS device, in response to determining to change the scheduled riding vehicle from the first vehicle, and present the extracted one or more candidate vehicles on a user terminal for the first user; and in response to receiving approval from the user terminal for the first user of the presented one or more candidate vehicles, change the scheduled riding vehicle from the first vehicle to a second vehicle that is one of the extracted one or more candidate vehicles of the plurality of vehicles.

8. A non-transitory computer-readable storage medium storing a riding vehicle adjusting program including instructions causing a computer to execute:
- a step of assigning a first vehicle of a plurality of vehicles in the rideshare system as a scheduled riding vehicle, and assigning a first boarding place, which is a location where a first user will meet the first vehicle at a scheduled time and the first user will board the first vehicle to travel to a destination;
- a step of determining whether the first vehicle will reach the first boarding place at a time deviating by a predetermined time period or longer from the scheduled time based on (i) a current location of the first vehicle detected in real time by a global positioning system (GPS) device installed in the first vehicle, which is transmitted to the information processing apparatus from the GPS device, and (ii) navigation data of the first vehicle to travel to the first boarding place, which is transmitted from a processing device installed in the first vehicle that provides a navigation process for the first vehicle;
- in response to determining that the first vehicle will reach the first boarding place at the time deviating by the predetermined time period or longer from the scheduled time, a step of determining, before the scheduled time occurs, to change the scheduled riding vehicle from the first vehicle to a different vehicle of the plurality of vehicles;
- a step of extracting one or more candidate vehicles of the plurality of vehicles serving as alternative vehicles for the first vehicle based on at least a current location of each of the one or more candidate vehicles detected in real time by a GPS device installed in each of the one or more candidate vehicles, which is transmitted to the information processing apparatus from the respective GPS device, in response to determining to change the scheduled riding vehicle from the first vehicle, and presenting the extracted one or more candidate vehicles on a user terminal for the first user; and
- in response to receiving approval from the user terminal for the first user of the presented one or more candidate vehicles, a step of changing the scheduled riding vehicle from the first vehicle to a second vehicle that is one of the extracted one or more candidate vehicles of the plurality of vehicles.

\* \* \* \* \*